US012714547B2

(12) United States Patent
Bloch et al.

(10) Patent No.: US 12,714,547 B2
(45) Date of Patent: Aug. 25, 2026

(54) ORAL CARE SYSTEM, IMPLEMENT, AND/OR KIT

(71) Applicant: Colgate-Palmolive Company, New York, NY (US)

(72) Inventors: Brian Bloch, Hillsborough, NJ (US); Takahide Okai, Highland Park, NJ (US); Geoffrey Baldwin, Westport, CT (US); Danielle Denis, Brooklyn, NY (US); Kimberly Curtis, New York, NY (US)

(73) Assignee: Colgate-Palmolive Company, New York, NY (US)

( * ) Notice: Subject to any disclaimer, the term of this patent is extended or adjusted under 35 U.S.C. 154(b) by 418 days.

(21) Appl. No.: 18/059,565

(22) Filed: Nov. 29, 2022

(65) Prior Publication Data

US 2023/0189979 A1 Jun. 22, 2023

Related U.S. Application Data

(60) Provisional application No. 63/290,826, filed on Dec. 17, 2021.

(51) Int. Cl.
*A61C 17/22* (2006.01)
*A46B 5/00* (2006.01)
(Continued)

(52) U.S. Cl.
CPC .............. *A61C 17/222* (2013.01); *A46B 5/00* (2013.01); *A46B 5/0095* (2013.01); *A46B 9/04* (2013.01);
(Continued)

(58) Field of Classification Search
CPC ... A61C 17/222; A61C 17/221; A61C 17/224; A61C 17/34; A46B 5/0095; A46B 5/00;
(Continued)

(56) References Cited

U.S. PATENT DOCUMENTS 4,450,599 A 5/1984 Scheller et al.
D361,433 S 8/1995 Yang
(Continued)

FOREIGN PATENT DOCUMENTS

CA 2658556 2/2007
CN 2072387 3/1991
(Continued)

OTHER PUBLICATIONS

Love, J. and Wheeler, G., "Suri Toothbrush Review—Electric Teeth," Jul. 22, 2022, https://www.electricteeth.com/suri-review/, retrieved Sep. 30, 2022, pp. 1-49.
(Continued)

*Primary Examiner* — Katina N. Henson

(57) ABSTRACT

An oral care device having a head with cleaning elements and a handle coupled to the head. The handle may include a selectively rotatable ring arranged between the head and a distal end of the handle that is configured to allow a user to select a desired mode of operation of the oral care device. The handle may include a selectively illuminated light that is configured to display at least one color that visually indicates that certain behaviors, patterns, and/or consistent habits have been performed successfully. The handle may include a processor configured to track a duration of a user's brushing session, a light ring on a bottom surface of the handle, and a pressure sensor. Respective portions of the light ring may be selectively illuminated by the processor to visualize progress toward achieving a predetermined brushing routine time and/or to visualize an over-pressure condition sensed by the pressure sensor.

20 Claims, 23 Drawing Sheets

(51) Int. Cl.

| | |
|---|---|
| ***A46B 9/04*** | (2006.01) |
| ***A46B 13/02*** | (2006.01) |
| ***A46B 15/00*** | (2006.01) |
| ***A61C 17/34*** | (2006.01) |

(52) U.S. Cl.

CPC .......... *A46B 13/02* (2013.01); *A46B 15/0004* (2013.01); *A46B 15/0008* (2013.01); *A46B 15/0012* (2013.01); *A46B 15/0036* (2013.01); *A46B 15/0044* (2013.01); *A61C 17/221* (2013.01); *A61C 17/224* (2013.01); *A61C 17/34* (2013.01)

(58) Field of Classification Search

CPC ....... A46B 9/04; A46B 13/02; A46B 15/0004; A46B 15/0008; A46B 15/0012; A46B 15/0036; A46B 15/0044

USPC ............................................................ 15/22.1

See application file for complete search history.

(56) References Cited

U.S. PATENT DOCUMENTS

| | | | | |
|---|---|---|---|---|
| D397,554 | S | 9/1998 | Sprague | |
| D402,811 | S | 12/1998 | Stansbury, Jr. | |
| 5,894,453 | A | 4/1999 | Pond | |
| D439,413 | S | 3/2001 | Klein | |
| D474,026 | S | 5/2003 | Wright | |
| D490,981 | S | 6/2004 | Hoffecker | |
| D499,884 | S | 12/2004 | Chan et al. | |
| 6,954,961 | B2 | 10/2005 | Ferber | |
| D585,197 | S | 1/2009 | Crossman | |
| 7,784,144 | B2 | 8/2010 | Renault | |
| D649,787 | S | 12/2011 | Ivarsson | |
| 8,075,315 | B2 | 12/2011 | Gatzemeyer et al. | |
| 8,585,411 | B2 | 11/2013 | Puurunen et al. | |
| D694,524 | S | 12/2013 | Erskine-Smith | |
| D696,023 | S | 12/2013 | Gebski | |
| D719,737 | S | 12/2014 | Adriaenssen et al. | |
| 9,038,226 | B1 | 5/2015 | Franklin | |
| D749,851 | S | 2/2016 | Watkins | |
| 9,277,979 | B2 | 3/2016 | Ikkink et al. | |
| 9,301,821 | B2 | 4/2016 | Fattori | |
| D759,381 | S | 6/2016 | Watkins | |
| D771,388 | S | 11/2016 | Since | |
| D824,175 | S | 7/2018 | Yan | |
| D824,677 | S | 8/2018 | Tseng et al. | |
| 10,141,770 | B2 | 11/2018 | Partovi | |
| D837,525 | S | 1/2019 | Evans | |
| 10,172,697 | B2 | 1/2019 | Bloch et al. | |
| 10,500,023 | B2 | 12/2019 | Okai | |
| 10,603,150 | B2 | 3/2020 | Bloch et al. | |
| D895,295 | S | 9/2020 | Xu | |
| D911,713 | S | 3/2021 | Okai et al. | |
| D912,989 | S | 3/2021 | Albay et al. | |
| 10,932,554 | B2 | 3/2021 | Greer, Jr. et al. | |
| 11,096,768 | B1 | 8/2021 | Lin | |
| D933,962 | S | 10/2021 | He | |
| D935,192 | S | 11/2021 | He et al. | |
| D935,193 | S | 11/2021 | He et al. | |
| 11,197,538 | B2 | 12/2021 | Greve | |
| 11,337,785 | B2 | 5/2022 | Ortins et al. | |
| 11,342,792 | B2 | 5/2022 | Partovi et al. | |
| 11,350,728 | B1 | 6/2022 | Shen | |
| D957,824 | S | 7/2022 | Park | |
| 11,406,480 | B2 | 8/2022 | Gatzemeyer et al. | |
| D970,897 | S | 11/2022 | Safavi | |
| 11,484,253 | B2 | 11/2022 | Gatzemeyer et al. | |
| D971,609 | S | 12/2022 | Takahashi et al. | |
| D997,567 | S | 9/2023 | Okai et al. | |
| 11,759,300 | B1 | 9/2023 | Huang | |
| 2006/0027246 | A1 | 2/2006 | Wilkinson | |
| 2008/0250583 | A1 | 10/2008 | Green | |
| 2010/0043156 | A1 | 2/2010 | Kressner | |
| 2015/0020325 | A1 | 1/2015 | Yoshida et al. | |
| 2019/0063696 | A1 | 2/2019 | Grandadam | |
| 2020/0029680 | A1* | 1/2020 | Farrell | A46B 15/0044 |
| 2020/0078152 | A1 | 3/2020 | Wada | |
| 2021/0112965 | A1* | 4/2021 | Jeanne | G16H 50/30 |
| 2021/0186198 | A1 | 6/2021 | Curtis et al. | |
| 2021/0186414 | A1* | 6/2021 | Gatzemeyer | A46B 15/004 |
| 2021/0289930 | A1 | 9/2021 | Wagner | |
| 2021/0320455 | A1 | 10/2021 | Bondurant | |
| 2022/0151754 | A1 | 5/2022 | Lee | |
| 2023/0190432 | A1 | 6/2023 | Bloch et al. | |
| 2023/0301424 | A1 | 9/2023 | Ogunsina et al. | |

FOREIGN PATENT DOCUMENTS

| | | |
|---|---|---|
| CN | 103876850 | 4/2017 |
| CN | 212912123 | 4/2021 |
| GB | 2541416 | 2/2017 |
| KR | 20190126158 | 11/2019 |
| WO | 2013/101300 | 7/2013 |
| WO | 2014/098949 | 6/2014 |
| WO | 2018/166852 | 9/2018 |
| WO | 2023/113999 | 6/2023 |

OTHER PUBLICATIONS

Napitu, Amanda, “Oral-B iO Toothbrush: Review of Series Options and Their Prices,” Oral-B iO Electric Toothbrush Review: Is It Worth the Price? Dentily.org, Jan. 4, 2022,(updated Sep. 28, 2022) retrieved Oct. 4, 2022, https://www.dentaly.org/us/best-electric-toothbrush/best-oral-b/oral-b-io/, pp. 1-13.

Toronto Life, “A Tootbrush Like No Other,” Created for Oral-B, Oral-B iO, https://torontolife.com/style/toothbrush-like-no-other/, retrieved Oct. 4, 2022, pp. 1-4.

walmart.com, Motor Electric Toothbrush—Rotary Switch Electric Toothbrush with 3 Different Brush Heads for Children and Adults—Walmart.com, retrieved Sep. 14, 2022, https://www.walmart.com/ip/Motor-Electric-Toothbrush-Rotary-Switch-Electric-Toothbrush-with-3-Different-Brush-Heads-for-Children-and-Adults/1964194661?wmlspartner=wlpa&selectedSellerld=16214, pp. 1-5.

2022, Colgate Hum Kids Battery Powered Smart Toothbrush, early review. Retrieved from internet, https://www.amazon.com/dp/B0917HS5RG/.

International Search Report and the Written Opinion of the International Searching Authority issued in International Application PCT/US2022/051230 mailed Mar. 24, 2023.

Colgate Pulse Connected Series 2, posted Feb. 15, 2023 [online], [retrieved Oct. 23, 2023]. Retrieved from internet, https://www.amazon.com.au/dp/B0BVT8RCTL/ (Year: 2023).

How To Use Colgate Pulse Series 2 Connected Electric Toothbrush, posted Feb. 26, 2023 [online Oct. 23, 2023]. Retrieved from internet, https://www.youtube.com/watch?v=MbagfMRIWjA (Year:2023).

* cited by examiner 273
240
270
241
244
272
271
242
243

ORAL CARE SYSTEM, IMPLEMENT, AND/OR KIT

CROSS-REFERENCE TO RELATED APPLICATIONS

The present application claims the benefit of priority to U.S. Provisional Patent Application Ser. No. 63/290,826, filed Dec. 17, 2021, the entirety of which is incorporated herein by reference.

BACKGROUND

Electric toothbrushes have been turned into high tech gear through the incorporation of motion sensors and internal cameras, and through the integration of external cameras, smart phones, and apps, all with the goal of improving the oral care routines of users. The motion sensors can help track the brushing routine, the cameras can acquire images or video of the oral cavity during the routine, and the smart phones can help provide feedback to the user to improve the routine. Such technology has been incorporated into toothbrushes in order to help the user form better habits, learn more about and focus on weaknesses in their oral care routine, or to enable the user to share the information with their dental professional. While these advances are incredibly useful, electric toothbrushes are known to have some unwanted side effects including excessive complexity and cost.

Currently, there is an unmet need for an affordable, consumer level toothbrush that provides meaningful feedback, optionally without concurrent or immediate connection to the user's phone or other smart device, and which also includes both style and ergonomic functionality. Therefore, what is desired is a toothbrush that includes cost effective, practical features that provide the user with meaningful positive brushing feedback and easy functionality.

BRIEF SUMMARY

An oral care implement, system, and/or kit. The oral care system may include one or more of a set of features to provide a user with meaningful feedback during and/or after an oral care session. The oral care system may include a trend tracker which provides a user with feedback regarding their brushing trends. The oral care system may include a timer which provides the user with feedback regarding the time elapsed during an oral care session. The oral care system may include a pressure indicator to provide the user with feedback regarding times when excessive pressure are used during an oral care session. The oral care system may include a novel switch mechanism for switching between different modes of operation. The oral care system may include a novel attachment mechanism for facilitating the attachment of a refill head to a handle.

In one aspect, the invention may be an oral care system comprising: an oral care implement comprising an oral care tool for treating an oral cavity of a user during an oral care session; a control circuit comprising, in operable cooperation: a power source integrated into the oral care implement; a trend tracking unit integrated into the oral care implement, wherein the trend tracking unit is configured to monitor: a duration of each oral care session performed using the oral care implement; and a number of the oral care sessions performed using the oral care implement on a single day; a trend indicator unit integrated into the oral care implement and configured to generate a user perceptible stimuli; wherein the trend indicator unit generates a first user perceptible stimuli when a first set of parameters is met, the first set of parameters comprising: (1) the duration of a current oral care session performed using the oral care implement exceeding a duration threshold; and (2) the number of the oral care sessions performed on the single day meeting or exceeding a frequency threshold; and wherein the trend indicator unit generates a second user perceptible stimuli when the first set of parameters is met for at least a predetermined number of consecutive days.

In another aspect, the invention may be an oral care system comprising: an oral care implement comprising an oral care tool for treating an oral cavity of a user; a control circuit comprising, in operable cooperation: a power source integrated into the oral care implement; a trend tracking unit integrated into the oral care implement, wherein for each oral care session performed using the oral care implement the trend tracking unit is configured to monitor: a duration of the oral care session; and a number of the oral care sessions performed in a single day; a trend indicator unit integrated into the oral care implement and configured to generate a user perceptible stimuli; and wherein the trend indicator unit generates a first user perceptible stimuli when a first set of parameters is met for at least a predetermined number of consecutive days, the first set of parameters comprising: (1) the duration of a current oral care session performed using the oral care implement exceeding a duration threshold; and (2) the number of the oral care sessions performed in the single day meeting or exceeding a frequency threshold.

In yet another aspect, the invention may be an oral care implement comprising: a handle comprising a gripping portion defining a cavity, the gripping portion comprising a longitudinal axis; a motor located in the cavity; a power source located in the cavity and operably coupled to the motor; a mode selection unit coupled to the gripping portion of the handle, the mode selection unit comprising a ring element that is rotatable about the longitudinal axis relative to the gripping portion of the handle to alter a mode of operation of the oral care implement between a plurality of modes including: (1) a first mode whereby the motor operates at a first speed; and (2) a second mode whereby the motor operates at a second speed that is greater than the first speed; and an actuation element located on an exterior surface of the handle, wherein activation of the actuation element powers the motor to operate in accordance with a selected one of the plurality of modes.

In still another aspect, the invention may be an oral care implement comprising: a handle comprising: a longitudinal axis; a gripping portion having a bottom end and a top end; a mode selection ring element rotatably coupled to the gripping portion adjacent to the top end of the gripping portion; a motion inducing unit; and a power source operably coupled to the motor; wherein the mode selection ring element is rotatable about the longitudinal axis relative to the gripping portion to alter a mode of operation of the oral care implement.

In a further aspect, the invention may be an oral care implement comprising: a handle comprising a bottom end and a top end; a head comprising an oral care tool, the head being coupled to the top end of the handle; an illumination ring at the bottom end of the handle; a control circuit comprising, in operable cooperation: a power source; a timer unit configured to track time during performance of an oral care session using the oral care implement; and a time indicator unit that is configured to illuminate the illumination ring; and the control circuit configured to activate the time indicator unit to illuminate the illumination ring in a manner that informs the user, during the oral care session, of intervals of time that have passed during performance of the oral care session.

In yet a further aspect, the invention may be an oral care implement comprising: a handle; a head comprising an oral care tool, the head being coupled to the handle; an illumination ring located on the handle; a control circuit comprising, in operable cooperation: a power source; a timer unit configured to track time during performance of an oral care session using the oral care implement; a time indicator unit that is configured to illuminate the illumination ring; a pressure sensor configured to determine whether an amount of pressure being applied during the performance of the oral care session exceeds a pressure threshold; a pressure indicator unit that is configured to illuminate the illumination ring; wherein the control circuit is configured to activate the time indicator unit to illuminate the illumination ring in a manner that informs the user, during the oral care session, of intervals of time that have passed during performance of the oral care session; and wherein the control circuit is configured to activate the pressure indicator unit to illuminate the illumination ring in a manner that informs the user, during the oral care session, that the amount of pressure being applied exceeds the pressure threshold.

In a still further aspect, the invention may be an oral care implement comprising: a handle having a bottom end and a top end; a motor positioned within the handle; a drive shaft coupled to the motor and configured to be oscillated by the motor when the motor is powered, the drive shaft protruding from the top end of the handle; an adapter coupled directly to the drive shaft so that the adaptor oscillates in conjunction with the drive shaft; and a refill head detachably coupled to the adaptor so that the refill head oscillates in conjunction with the adaptor and the drive shaft.

In another aspect, the invention may be an oral care kit comprising: a handle having a top end; a motor positioned within the handle; a drive shaft coupled to the motor and configured to be oscillated by the motor when the motor is powered, the drive shaft protruding from the top end of the handle; an adaptor configured to be selectively coupled to the drive shaft; a first refill head comprising a first type of connection feature, the first refill head configured to be coupled directly to the drive shaft via engagement between the first type of connection feature and the drive shaft; and a second refill head comprising a second type of connection feature, the second refill head configured to be coupled to the adaptor when the adaptor is coupled to the drive shaft via engagement between the second type of connection feature and the adaptor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
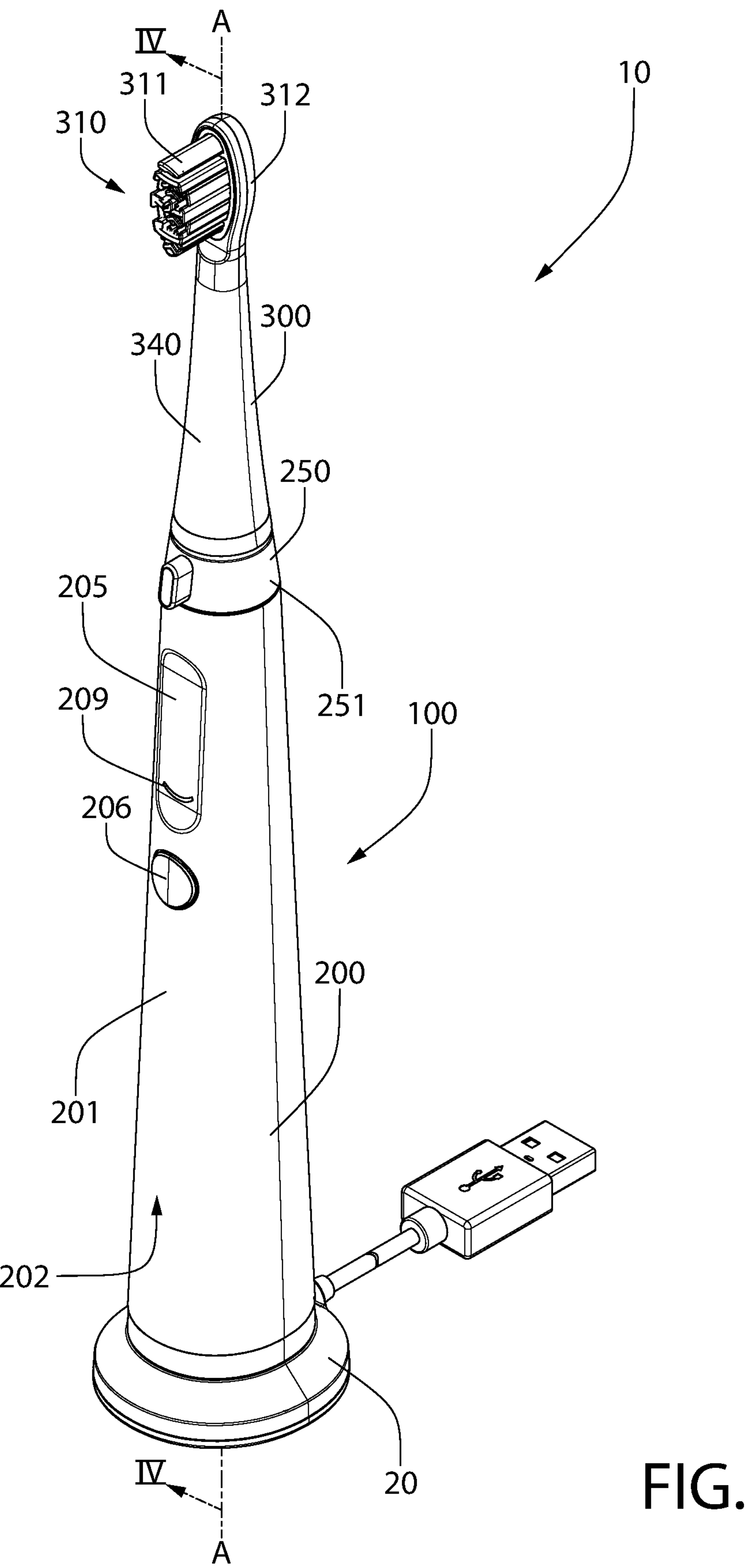
FIG. 1 is a front perspective view of an oral care implement and charger in accordance with an embodiment of the present invention.
Figure 2:
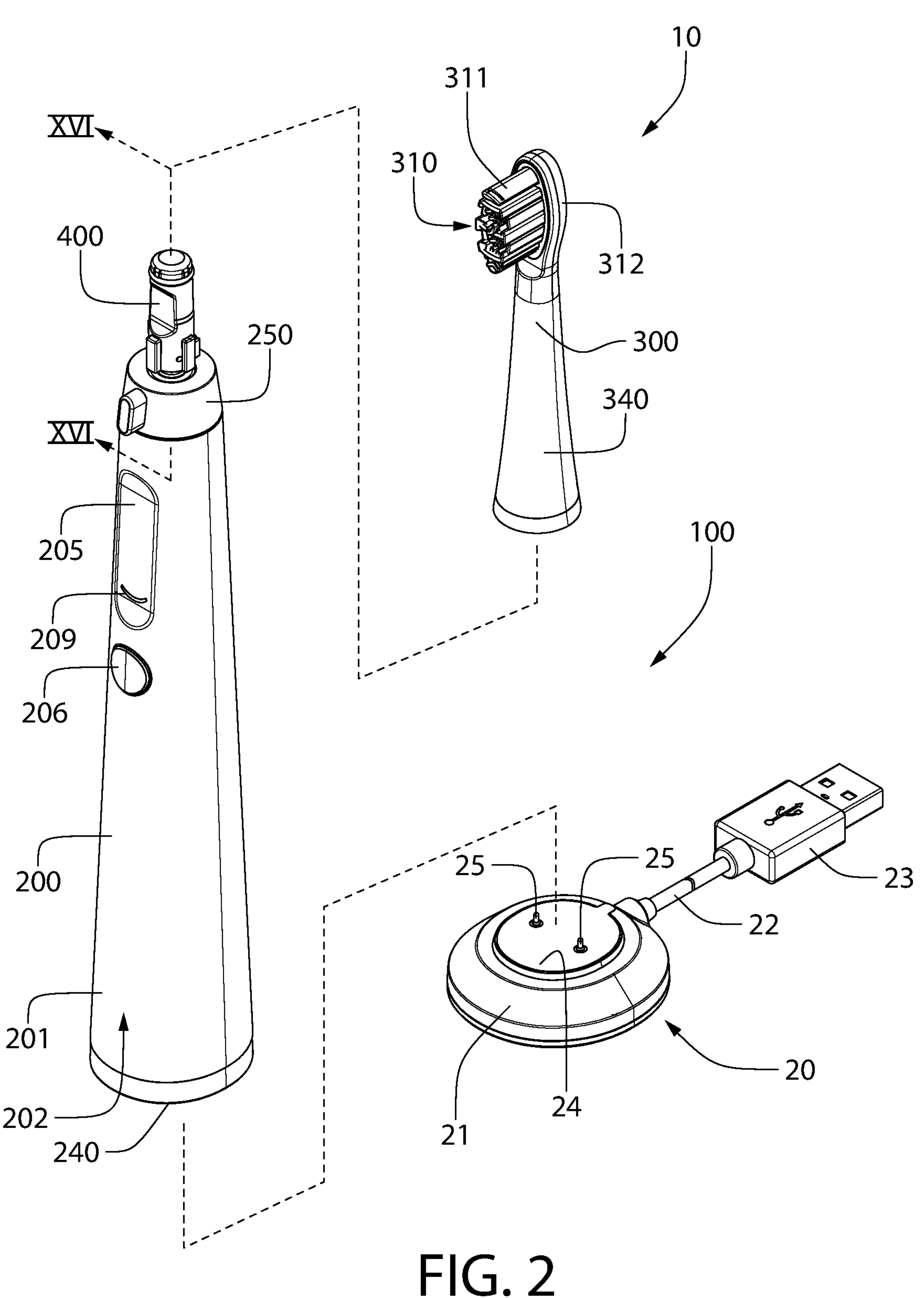
FIG. 2 is a front perspective view of the oral care implement and charger of FIG. 1 with a refill head of the oral care implement detached from a handle of the oral care implement.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Features of the present invention(s) may be implemented in software, hardware, firmware, or combinations thereof. In particular, the various units that form a part of the control circuit described herein may comprise software, hardware, firmware, and combinations thereof. Each such "unit" may comprise its own processor, or it may be coupled to a processer that is used for all components of the control circuit, or some combination of this may occur. The computer programs described herein are not limited to any particular embodiment, and may be implemented in an operating system, application program, foreground or background processes, driver, or any combination thereof. The computer programs may be executed on a single computer or server processor or multiple computer or server processors.

Processors (also referred to as controllers or control units) described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc. In one particular embodiment, a processor unit may reside on the device (oral care implement as described herein) itself and all processing can be done internally and integrally on the device without limitation and without the need of any outside resource.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device," or "device," and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention(s) may be embodied in the form of computer-implemented processes and apparatuses such as processor-based data processing and communication systems or computer systems for practicing those processes. The present invention(s) may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Referring to FIGS. 1-4 concurrently, an oral care system 10 which includes an oral care implement 100 and a charger 20 is illustrated in accordance with an embodiment of the present invention. In the exemplified embodiment, the oral care implement 100 is a toothbrush. More specifically, in the exemplified embodiment the oral care implement is an electric or powered toothbrush. However, the invention is not to be so limited in all embodiments and the oral care implement 100 could take on other structural forms, including being a manual toothbrush, a tongue scraper, a gum and soft tissue cleanser, a water pick, an interdental device, a tooth polisher, a specially designed ansate implement having tooth engaging elements, or any other type of implement that is commonly used for oral care. Furthermore, in still other embodiments the implement may not be specifically used for oral care, but could instead be a personal care implement which includes the various types of oral care implements noted herein and also includes hairbrushes, razors, body scrubbers, skin treatment devices, or the like. Thus, it is to be understood that the inventive concepts discussed herein can be applied to various types of oral care implements or personal care implements unless a specific type of implement is specified in the claims. The structural and functional details of the oral care implement 100 will be provided below in accordance with exemplary embodiments of the present invention.

The oral care implement 100 may comprise a handle 200 and an oral care refill head 300. The oral care refill head 300 may be detachably coupled to the handle 200 so that the oral care refill head 300 can be replaced when the cleaning elements thereof become worn. Details regarding the connection mechanism(s) that facilitate the coupling between the oral care refill head 300 and the handle 200, which may be direct or indirect, will be provided below. In other embodiments, the oral care implement 100 may be an integral or monolithic structure that includes the handle 200 and a head such that the head is not detachable from the handle 200. The oral care implement 100 may be elongated along a longitudinal axis A-A.

The oral care refill head 300 may comprise an oral care treatment portion (also referred to herein as an oral care tool) 310 and a sleeve portion 340. The oral care tool 310 may comprise a head portion 312 of the oral care refill head 300 and a plurality of tooth cleaning elements 311. The sleeve portion 340 and the head portion 312 may be integrally formed as a single unitary structure. The tooth cleaning elements 311 may be coupled to the head portion 312, and specifically may protrude from a front surface of the head portion 312. A soft tissue or tongue cleaner 313 may be located on the rear surface of the head portion 312.

The term tooth cleaning elements may be used in a generic sense to refer to any structure that can be used to clean, polish, or wipe the teeth and/or soft oral tissue (e.g. tongue, cheek, gums, etc.) through relative surface contact. Common examples of tooth cleaning elements may include, without limitation, bristle tufts, filament bristles, fiber bristles, nylon bristles, polybutylene terephthalate (PBT) bristles, spiral bristles, rubber bristles, elastomeric protrusions, flexible polymer protrusions, combinations thereof, and/or structures containing such materials or combinations. Thus, any combination of these tooth cleaning elements may be used within the tooth cleaning element field in some embodiments. Furthermore, where bristles are used for one or more of the tooth cleaning elements 311, such bristles can be tapered, end-rounded, spiral, or the like. The tooth cleaning elements 311 may be coupled to the oral care tool 310 using any known techniques such as staples, in-mold tufting, anchor-free tufting (AFT), PTT, or the like. The soft tissue cleaner 313 may be formed from a resilient material such as a thermoplastic elastomer and may be injection molded onto the rear surface of the head portion 312.

The refill head 300 may comprise an inner surface 314 that defines a refill head cavity 315. The refill head cavity 315 may comprise an opening 316 at a bottom end 317 of the refill head 300. The refill head cavity 315 may be located along just the sleeve portion 340 in some embodiments, although it may extend into the head portion 312 in some embodiments. The refill head cavity 315 may be configured to receive a portion of the handle 200 or some intermediary structure to facilitate the attachment of the refill head 300 to the handle 200. That is, the portion of the handle 200 or the intermediary structure may be inserted into the refill head cavity 315 through the opening 316 in the bottom end 317 of the refill head 300.

The handle 200 may generally comprise a gripping portion 201 and a mode selection unit 250 that is rotatably coupled to the gripping portion 201. The gripping portion 201 may include an outer surface 202 and an inner surface 203. The inner surface 203 may define a handle cavity 204 within which electronics and other functional components of the oral care implement 100 are located. The gripping portion 201 of the handle 200 may include a display portion 205 on which information, data, lights, or the like may be displayed to a user and an actuation element 206 that facilitates activation of a motor of the oral care implement 100. In the exemplified embodiment, there is a visible feedback element 209 being displayed on the display portion 205. The visible feedback element 209 may not be displayed on the display portion 205 at all times. The visible feedback element 209 may be arcuate shaped. The visible feedback element 209 may resemble a smile, such that it may have a downwardly facing convex side and an upwardly facing concave side. The resemblance of the visible feedback element 209 to a smile may be preferable to provide a user with a good feeling to start and end their day. In some embodiments, regardless of the user's brushing habits, the visible feedback element 209 may light up in a smile shape when the oral care implement 100 is powered on or after completion of an oral care session or at other times as desired. In alternative embodiments, the visible feedback element 209 may take on other shapes and it need not be arcuate shaped in all embodiments. The visible feedback element 209 may be a star or a graphic or a letter or text or any other image in alternative embodiments. The exact shape of the visible feedback element 209 may be modifiable or alterable by the end user in some embodiments.

The visible feedback element 209 may form part of a user perceptible stimuli that is intended to indicate information to a user, such as information related to a user's brushing trends. The visible feedback element 209 may not always be displayed on the display portion 205, and various characteristics of the visible feedback element 209 may change depending on the information intended to be imparted to the user. Additional details about this will be provided below. The gripping portion 201 of the handle 200 may have a cylindrical shape as shown which may taper from a bottom end towards a top end, or may have any other desired shape to enhance grip comfort to a user during use of the oral care implement 100.

A chassis 210 which supports various electronic components may be located within the handle cavity 204. The electronic components may include a motor 211 having a drive shaft 212 coupled thereto and a power source 213 which is operably coupled to the motor 211. The power source 213 may comprise one or more batteries. In some embodiments, upon a user activating the actuation element 206, power may be supplied from the power source 213 to the motor 211 to cause the motor 211 to rotate or oscillate the drive shaft 212. A distal portion 214 of the drive shaft 212 may protrude from a top end of the handle 200. Rotation or oscillation of the drive shaft 212 may cause the tooth cleaning elements 311 of the oral care refill head 300 to vibrate, oscillate, or otherwise move in a manner which is intended to clean tartar, plaque, and other debris from a user's teeth and other oral cavity surfaces. As used herein, the term "oral cavity" refers to the user's mouth, which may include the lips, the lining inside the cheeks and lips, the tongue or a portion thereof, the upper and lower gums, the floor of the mouth under the tongue, the roof of the mouth (i.e., the hard and soft palate), the small area behind the wisdom teeth, and the teeth. In essence, the "oral cavity" is any area or region or surface within the mouth which may be accessible by the oral care tool 310 for cleaning or other treatment.

In some embodiments the motor 211 may be a bipole motor. In some embodiments the motor 211 may be an oscillating motor. In some embodiments the motor 211 may oscillate back and forth without performing a full rotation. In other embodiments the motor 211 may be configured to rotate a full 360°.

The chassis 210 also supports a circuit board 290 having various electronic components thereon, including lights like light emitting diodes, resisters, capacitors, memory units, processors, sensors, and various other electronic units or devices, some of which are described below with reference to FIG. 5.

The gripping portion 201 of the handle 200 may have a bottom end 207 with an opening 208 therein through which the chassis 210 and the electronic components may be inserted into the handle cavity 204. The handle 200 may further comprise an end cap 220 which is configured to be coupled to the bottom end 207 of the gripping portion 201 to close the opening 208. The end cap 220 may be coupled to the gripping portion 201 with a snap-fit, friction fit, screw thread, or other connection, including using separate hardware such as screws or the like.

The charger 20 may include a support body 21, a wire 22, and a plug 23. The wire 22 may be coupled to the plug 23 and to the support body 21. The plug 23 may be a USB-style plug as shown or other styles including standard electrical outlet plugs depending on the particular type of outlet to which the plug is to be coupled. The support body 21 may comprise a support surface 24 having a pair of pins 25 protruding therefrom. The pins 25 may be configured to engage with a feature (i.e., charging contacts) of the oral care implement 100 to facilitate the transfer of power to the power source 213 of the oral care implement 100 for purposes of charging the same. While pins 25 are shown in the exemplified embodiment, in other embodiments the oral care implement 100 may have pins which engage with or nest within recesses in the support surface 24 of the support body 21. The charger 20 may include magnets which interact with magnets on the bottom end of the oral care implement 100 to ensure that the pins 25 are properly oriented relative to the oral care implement 100 to facilitate charging. That is, the magnets in the charger 20 and the oral care implement 100 may have polarities which are arranged to ensure the proper orientation of the oral care implement 100 and the charger 20 for pairing of the pins 25 of the charger 25 with charging contacts on the bottom end of the handle 200 of the oral care implement 100. The charger 20 may be a DC charger in some embodiments.

The oral care implement 100 may further include an adaptor 400 that is configured to be coupled directly to the distal portion 214 of the drive shaft 212. The adaptor 400 may be coupled to the distal portion 214 of the drive shaft 212 in a manner which ensures that the adaptor 400 rotates or oscillates along with the drive shaft 212 when the motor 211 is activated. The oral care refill head 300 may be configured to be coupled directly to the adaptor 400, and the details of this will be described below with reference to FIGS. 14-19.

Figure 5:
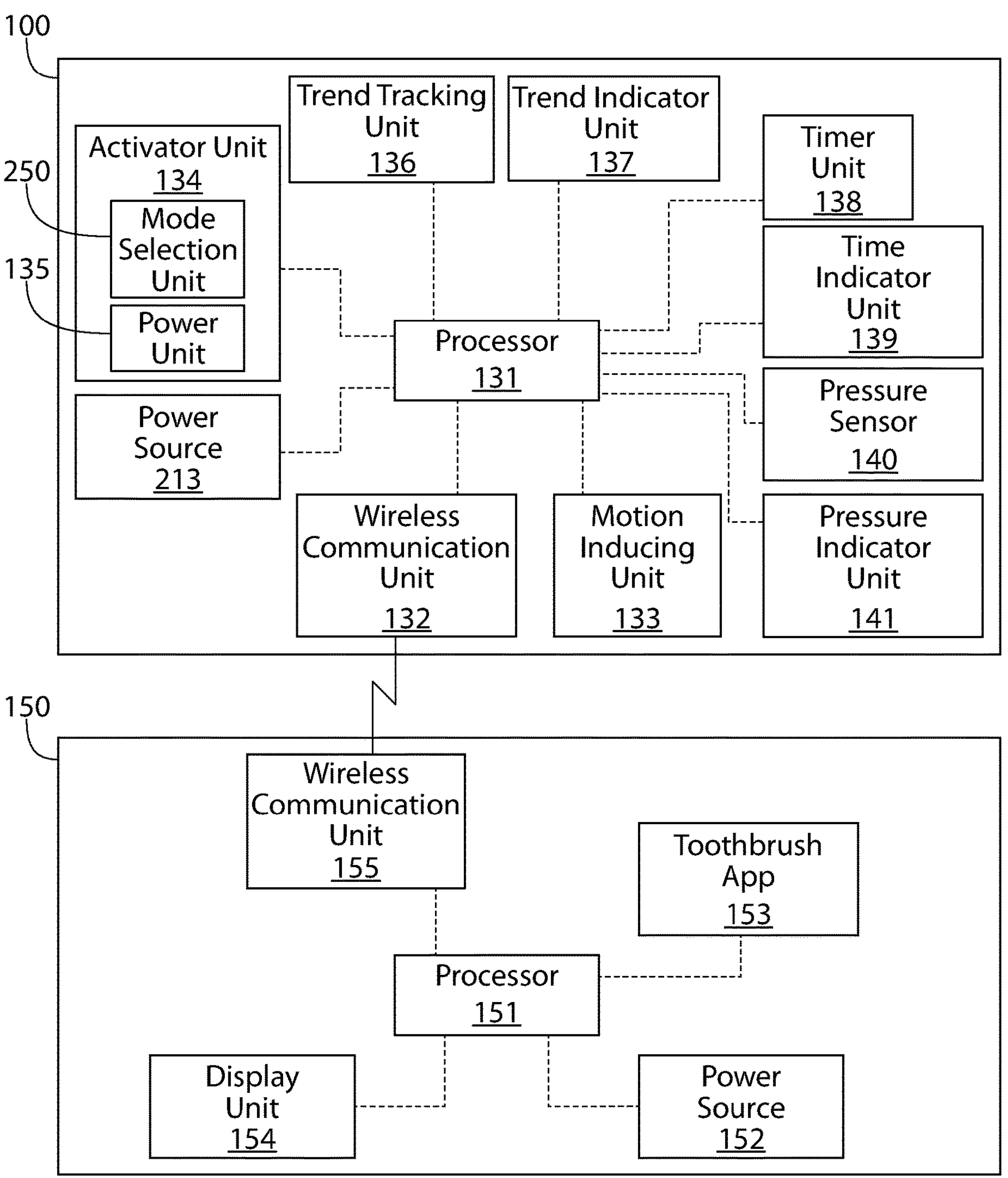
FIG. 5 is a block diagram of a control circuit of an oral care system which includes the oral care implement of FIG. 1 and an optional separate electronic device.

Referring to FIG. 5, a control circuit is illustrated for the oral care implement 100 and for an external electronic device 150. The external electronic device 150 may optionally form a part of the oral care system 10 described herein. That is, in some embodiments the oral care implement 100 may be configured to be placed into operable communication with the electronic device 150 so that the electronic device 150 may obtain information about a user's oral care habits performed using the oral care implement 100. The electronic device 150 may also be configured to display additional information to the user which cannot be provided to the user from the oral care implement 100 itself. However, the electronic device 150 may be optional in some embodiments and need not form part of the system 10 in accordance with all embodiments disclosed herein.

In embodiments that include the oral care implement 100 and the electronic device 150, those two devices are configured to be in operable communication with each other in some circumstances, such as during an oral care session (e.g., toothbrushing or the like) so that data monitored or acquired by one of the devices can be transmitted to the other for processing, storage, display, or other purposes. Furthermore, the operable communication may allow user interaction with the electronic device 150 to control the operation of the oral care implement 100. Still further, the operable communication may allow an app that is launched on the electronic device 150 to control operation of the oral care implement 100 or present data to the user associated with the user's use of the oral care implement 100. For example, if the app is designed to store data about an oral care session, upon the memory in the electronic device 150 (or the memory to which the app has access) becoming full, the electronic device 150 may power down the oral care implement 100.

The operable communication between the oral care implement and the electronic device 150 is illustrated in FIG. 1, and it may be achieved by wireless or hard wire techniques. For example, in some embodiments a wire may be coupled to the oral care implement 100 and to the electronic device 150 to place those two devices into operable communication with one another. In other embodiments, wireless techniques may be used including Bluetooth, Wi-Fi, LAN, Zigbee, infrared, RFID, or the like. However, in other embodiments the oral care system 10 may comprise the oral care implement 100 by itself without the electronic device 150 and all of the data acquisition and processing may take place within the oral care implement 100. Thus, while the drawings show some exemplary embodiments of the invention, it should be appreciated that the invention is not to be limited solely by those exemplary embodiments. Rather, the scope of the invention as described herein covers variations that are not shown explicitly in the drawings but that are explicitly described and/or claimed.

The control circuit of the oral care implement 100 and the electronic device 150 may comprise several different "units" and other electronic components that are in operable communication or operable cooperation with one another. As mentioned above, the term "unit" as used herein refers to an electronic component and its software, hardware, and processors, although the processors may be separate components that are coupled to the "unit" as shown in the embodiment of FIG. 5. As will be discussed below, in the exemplified embodiment there is a processor 131 associated with the oral care implement 100 and a processor 151 associated with the electronic device 150, and each of the electronic components of the control circuit is operably coupled to one of the processors 131, 151. However, in other embodiments one or more of the "units" may have its own controller or processor. In such embodiments, the various "units" may still be coupled to one of the controllers 131, 151, or they may not if they are able to process and transmit/receive data as needed for proper operation of the control circuit and the oral care implement 100 as described herein.

In the exemplified embodiment, some components of the control circuit are illustrated as being in the oral care implement 100 and other components of the control circuit are illustrated as being in the electronic device 150. However, it should be appreciated that the invention is not limited to this exact configuration in all embodiments. Specifically, some of the components of the control circuit that are depicted as being located in the oral care implement 100 may be located in the electronic device 150 in other embodiments and some of the components that are depicted as being located in the electronic device 150 may be located in the oral care implement 100 in other embodiments.

Furthermore, in the exemplified embodiment the components/units in the oral care implement 100 are depicted as being coupled to the processor 131 and the components/units in the electronic device 150 are depicted as being coupled to the processor 151. However, the invention is not to be so limited in all embodiments. Specifically, in some embodiments there may be one processor common to all of the components/units of the control circuit. In other embodiments, at least some of the components/units of the control circuit that are located in the oral care implement 100 may be operably coupled to the processor 151 of the electronic device 150. For example, various sensors in the oral care implement 100 may acquire data and then transmit that data to the processor 151 in the electronic device 150 in some embodiments. Furthermore, the processor 151 may be configured to control certain operation of the oral care implement 100 in some embodiments, such as power on/off, activation of the components, and the like.

The control circuit of the oral care implement 100 may include the processor 131, a wireless communication unit 132, a motion inducing unit 133 (which may comprise or be the motor 211), the power source 213, an activator unit 134 which may include the mode selection unit 250 and a power unit 135 (which may comprise or be the actuation element 206), a trend tracking unit 136, a trend indicator unit 137, a timer unit 138, a timer indicator unit 139, a pressure sensor 140, and a pressure indicator unit 141. Each of the components may be operably coupled to the processor 131 either directly as shown or indirectly. Alternatively, one or more of the components may include its own processor as noted herein. The processor 131 may include a memory unit which may store information, or a separate memory unit may be included which is operably coupled to the processor 131, or one or more of the "units" described herein may have their own memory.

With continued reference to FIG. 5, the various components of the control circuit will be described in a bit more detail. However, it should be appreciated that even more detail will be provided later on in this document as some exemplary embodiments of the invention are described. Thus, the discussion with reference to FIG. 5 is intended to be more of an overview with an understanding that additional details in accordance with one or more specific structural and functional embodiments will be provided later on in this document.

In the exemplified embodiment, the power source 213 that is located in the oral care implement 100 may comprise one or more batteries. Moreover, in some embodiments the power source 213 may be omitted and the oral care implement 100 may operate via a direct coupling to a mains power. In still other embodiments, solar power or other power sources can be used to power the oral care implement 100. The power source 213 may be individually coupled to each of the components of the control circuit that are located in the oral care implement 100, or the power source 213 may be coupled to the centralized processor 131, which can in turn transmit power from the power source 213 to each of the other components as needed. More than one power source 213 may be included in the oral care implement 100 as needed to provide sufficient power to all of the components of the control circuit.

In the exemplified embodiment, the first wireless communication unit 132 may be integrated into the oral care implement 100 to facilitate communication between the oral care implement 100 and the electronic device 150 and/or other electronic devices. In the exemplified embodiment, the first wireless communication unit 132 may be configured for Bluetooth communication, but other types of wireless communication devices and other types of wireless communication may be used instead in other embodiments.

The oral care implement 100 may further comprise the motion inducing unit 133, which may form a part of the control circuit or may be in operable cooperation with the control circuit without forming a part of the control circuit. In the exemplified embodiment, the motion inducing unit 133 may be operably coupled to the processor 131 so that the processor 131 can instruct the motion inducing unit 133 on its operation. The motion inducing unit 133 may comprise the motor 211, which may be an eccentric motor, an oscillating motor, a rotating motor, or any other vibration generating device. The motion inducing unit 133 may be configured to impart motion to the oral care tool 310 of the oral care implement 100 along which the cleaning elements 311 such as bristles are positioned. As a result, when the motion inducing unit 133 is activated, the cleaning elements 311 may oscillate or vibrate to improve the cleaning effect that they perform. The motion inducing unit 133 may perform other functions as well, such as possibly playing a role in the generation of a user perceptible stimulus to provide an indication function to indicate some type of information to the user (i.e., intervals during an oral care session, end of an oral care session, information regarding brushing trends, etc.).

The oral care implement may further include the activator unit 134, which may comprise the mode selection unit 250 and the power unit 135. The activator unit 134 may be integrated into the oral care implement 100. In some embodiments, some or all of the activator unit 134 may be located in the electronic device 150 instead of the oral care implement 100. Thus, for example, the mode selection unit 250 may be integrated into the electronic device 150 while the power unit 135 is integrated into the oral care implement 100, or both of the mode selection unit 250 and the power unit 135 may be integrated into the electronic device 150.

In the exemplified embodiment, the mode selection unit 250 comprises a ring element 251 (see FIG. 1) that is coupled to the gripping portion 201 of the handle 200. Specifically, in the exemplified embodiment the mode selection unit 250 is a rotating switch provided at a top end of the handle 200 of the oral care implement 100. Furthermore, in the exemplified embodiment the power unit 135 comprises the actuation element 206, which may be a power switch located on the front surface of the handle 200. The actuation element 206 may be a press button or the like. The mode selection unit 250 and the power unit 135 may be operably coupled to the processor 131. Actuation of the actuation element 206 of the power unit 135 may cause the processor 111 to power the oral care implement 100 on, which may include powering all of the components of the control circuit that are integrated into the oral care implement 100 as shown in FIG. 5 and described herein.

Actuation of the mode selection unit 250 may change a mode of operation of the oral care implement 100. The mode selection unit 250 may be configured to allow a user to select between a plurality of different modes, which may include a daily clean mode, a gentle clean mode, and a deep clean mode. In alternative embodiments, the modes that may be selected may include sensitive mode, regular mode, whitening mode, or the like. The modes may differ in the heightened frequency and/or amplitude of movement produced by the motion inducing unit 133. Depending on which mode is selected, the motion inducing unit 133 and/or motor 211 may operate at different speeds. The process of selecting modes and the function and operation of the mode selection unit 250 will be described in greater detail below with reference to FIGS. 6-8.

The timer unit 138 and the time indicator unit 139 may both be integrated into the oral care implement 100. The timer unit 138 and the time indicator unit 139 may be operably coupled to the processor 131. The timer unit 138 and the time indicator unit 139 may be coupled directly to each other in some embodiments, but their coupling to the processor 131 may be sufficient to ensure that data obtained by the timer unit 138 is transmitted to the time indicator unit 139 as described further herein. Each of the timer unit 138 and the time indicator unit 139 comprises the necessary hardware, software, and processors to facilitate their operation.

The timer unit 138 may comprise any device that is configured to track time during performance of an oral care session using the oral care implement 100. Thus, as the user cleans his/her oral cavity during the oral care session, the timer unit 138 will keep track of the amount of time that has elapsed during the oral care session. Thus, the timer unit 138 may comprise a clock, a timer, a count-up timer, a count-down timer, a stopwatch, or the like. The timer unit 138 may comprise its own processor, or it may be coupled to the processor 131, or both. An optional memory unit may be included and may be configured to store data relating to the time tracked during the performance of the oral care session. Thus, as the oral care session takes place, the timer unit 138 tracks the time that has elapsed and data relating to the time tracked by the timer unit 138 may be transmitted to the processor 131 and/or an optional memory unit (the processor 131 may comprise such a memory unit in some embodiments).

The timer unit 138 may track the time that has elapsed during an oral care session from start of the session to completion of the session. The processor 131 may be configured to activate the time indicator unit 139 in various ways during the oral care session based on the amount of time that has elapsed during the oral care session.

The time indicator unit 139 may be operably coupled to the timer unit 138. This may be a direct coupling or an indirect coupling such as in the exemplified embodiment whereby the time indicator unit 139 and the timer unit 138 are both coupled to the processor 111. The time indicator unit 139 may be configured to inform the user, during the oral care session, of the amount of time that has elapsed during the performance of the oral care session. Thus, the time indicator unit 139 may generate a user perceptible signal at various time intervals during an oral care session to indicate to the user the amount of time that has elapsed during the oral care session. This may be desirable because it is generally agreed that people should brush their teeth for approximately two minutes. Thus, providing the user with an indication of the amount of time that has elapsed during the oral care session can be beneficial to ensuring that the user continues the oral care session for the entire time period, whether that be two minutes, three minutes, or some other pre-determined time period. For a two minute brushing time, the time indicator unit 139 may be configured to generate a user perceptible signal at 30 second intervals to instruct the user to move between four distinct zones or quadrants of the oral cavity during the oral care session. Of course, the exact number of signals and the time interval between them may be other intervals, including every 10 seconds, every 15 seconds, every minute, or the like.

The time indicator unit 139 may comprise a speaker or the like if the user perceptible signal that it generates is a sound, a vibration generator or the like if the user perceptible signal that it generates is haptic or tactile, or one or more lights if the user perceptible signal that is generates is visual. In the exemplified embodiment, as will be described in greater detail below, the time indicator unit 139 comprises a plurality of light emitters such as light emitting diodes or other light sources so that the time indicator unit 139 can provide a visual indication of the amount of time that has elapsed during the oral care session to the user. The time indicator unit 139 may provide an indication to the user of the elapsed time in predetermined intervals, such as at every one-fourth of the total desired time period. Thus, for example, if the desired time for the oral care session is two minutes, then the time indicator unit 139 may generate an indication (by illuminating one or more light sources) every 30 seconds. Specific details about the time indicator unit 139 in accordance with one embodiment of the present invention will be provided below with reference to FIGS. 9-10D.

The pressure sensor 140 may be any device that is configured to detect when an amount of pressure being applied onto the head portion 312 of the oral care refill head 300 during an oral care session exceeds a pressure threshold. Such pressure sensors may be mechanical, electrical, electromechanical, or the like. For example, the pressure sensor 140 may comprise a lever that pivots when excess pressure is being applied onto the head, which can trigger an alarm or user perceptible signal being generated. As another example, the pressure sensor 140 may be an electronic device that detects pressure applied onto the head and converts the physical data into an electrical signal which can be used by the processor 131 to activate/deactivate the pressure indicator unit 141. As yet another example, the pressure sensor 140 may comprise a MEMS device and/or an interferometer or electromechanical biased pivot mechanism useful to determine (e.g., measure) pressure and/or changes in pressure applied to portions of the oral cavity by the cleaning elements or oral care tool 310 during an oral care session such as toothbrushing. The pressure sensor 140 may be incorporated into the oral care implement 100 and more specifically the handle cavity 204 of the handle 200. The pressure sensor 140 may monitor to detect when the pressure applied onto the head portion 312 exceeds a predetermined threshold and may then transmit data indicative of the same to the processor 131 (or directly to the pressure indicator unit 141 in embodiments where the pressure sensor 140 is directly coupled to the pressure indicator unit 141).

The pressure indicator unit 141 may be configured to generate a user perceptible signal on each occasion that the pressure being applied by the user during the oral care session is detected to exceed the predetermined threshold. The pressure indicator unit 141 may comprise a speaker or the like if the user perceptible signal that it generates is a sound, a vibration generator or the like if the user perceptible signal that it generates is haptic or tactile, or one or more lights if the user perceptible signal that is generates is visual. In the exemplified embodiment, as will be described in greater detail below, the pressure indicator unit 141 comprises a plurality of light emitters such as light emitting diodes or other light sources so that the pressure indicator unit 141 can provide a visual indication each time the pressure being applied by the user during an oral care session exceeds a predetermined threshold.

The trend tracking unit 136 and the trend indicator unit 137 may be incorporated into the oral care implement 100. The trend tracking unit 136 and the trend indicator unit 137 may be operably coupled together, either via a direct coupling or indirectly via being coupled to the processor 131 as shown in FIG. 5. The trend tracking unit 136 may be configured to track usage of the oral care implement for performance of oral care sessions. The trend tracking unit 136 may monitor, for each oral care session performed using the oral care implement 100, a duration of the oral care session. The trend tracking unit 136 may further monitor a number of the oral care sessions performed within a predetermined period of time. The predetermined period of time may be a single day. As used herein, a single day may refer to a single calendar day. Thus, the trend tracking unit 136 may comprise a timer like a clock, a timer, a count-up timer, a count-down timer, a stopwatch, or the like to track a duration of an oral care session. The trend tracking unit 136 may share one or more components with the time indicator unit 139, although they could be completely distinct.

As noted, in addition to tracking the duration of each oral care session, the trend tracking unit 136 may also track a number of the oral care sessions that have been performed within a predetermined period of time, which may be a single day. For example, dentists recommend that people brush their teeth twice a day. For most people, this is achieved by brushing in the morning (for example, between 6 AM and 9 AM and then brushing in the evening (for example, between 8 PM and 12 PM). Thus, the trend tracking unit 136 may monitor how many times a user brushes his teeth within a single calendar day. Alternatively, the trend tracking unit 136 may monitor how many times a user brushes his teeth within a given 18 hour time period. Thus, the predetermined period of time may be 18 hours. In other embodiments, the predetermined period of time may be 24 hours which is reflective of a full day, although 18 hours should be sufficient since most people sleep for at least 6 hours of each 24 hour day. The predetermined period of time may be in a range of 18 hours to 24 hours and may be adjusted by the manufacturer or by the end user in various embodiments.

The trend indicator unit 137 may generate a user perceptible stimuli dependent upon the information/data obtained by the trend tracking unit 136. The trend indicator unit 137 may comprise a speaker or the like if the user perceptible stimuli that it generates is a sound, a vibration generator or the like if the user perceptible stimuli that it generates is haptic or tactile, or one or more lights if the user perceptible stimuli that is generates is visual. In the exemplified embodiment, as will be described in greater detail below, the trend indicator unit 137 may comprise a plurality of light emitters such as light emitting diodes or other light sources so that the trend indicator unit 137 can provide a visual indication reflective of the information obtained by the trend tracking unit 136. The trend indicator unit 137 may comprise the visible feedback element 209 noted previously. Specifically, the trend indicator unit 137 may illuminate the visible feedback element 209 on the display portion 205 of the handle 100 as the user perceptible stimuli. The trend indicator unit 137 may illuminate the visible feedback element 209 in different colors depending on the data obtained by the trend tracking unit 136. In other embodiments, the trend indicator unit 137 may illuminate other shapes or features on the display portion 205 of the handle 200 depending on the data/information obtained by the trend tracking unit 136.

Still referring to FIG. 5, in the exemplified embodiment the electronic device 150 may also form part of the oral care system 10. The electronic device 150 may be in the form of a smart phone, computer, a laptop, a notebook, a tablet, any type of cellular phone, or other similar devices. In an embodiment, the control circuit may also comprise the following components integrated into or otherwise coupled to the electronic device 150: the processor 151, a power source 152, a toothbrush app 153 a display unit 154, and a wireless communication unit 155. The power source 152, the toothbrush app 153, the display unit 154, and the wireless communication unit 155 may be coupled together via the processor 151 or one or more of these may be coupled directly to one another, or some combination may occur.

The power source 152 may be any type of device typically used to power an electronic device such as a smart phone. For example, the power source 152 may be one or more batteries in some embodiments, although other power sources could be used in other embodiments. The wireless communication unit 155 may be configured for operable communication with the wireless communication unit 132 of the oral care implement 100. Thus, information gathered or processed by the oral care implement 100 can be transmitted to the electronic device 150 for various processing and/or storage and/or display on the display unit 154. The display unit 154 may be any type of display commonly used on an electronic device, such as a liquid-crystal display (LCD) or the like. The display unit 154 may allow for user interaction such as being a touch screen in some embodiments.

The toothbrush app 153 may be a mobile application that is stored on a memory device (not shown) of the electronic device 150. Specifically, the toothbrush app 153 may be an app that can be downloaded from an app store. The toothbrush app 153 may be a computer program or software application designed to run on an electronic device such as the electronic device 150. Due to the operable communication between the electronic device 150 and the oral care implement 100, data or information gathered or acquired from the various units of the oral care implement 100 can be transmitted to the electronic device 150 and used by the toothbrush app 153 to provide the user with the data in a manner that is valuable to that particular user for improving his/her cleaning performance or the like.

As described throughout, in some embodiments the oral care system 10 may include the oral care implement 100 but not the electronic device 150. In such an embodiment, all user perceptible signals and stimuli may occur on the oral care implement 100 and all data tracking and monitoring may occur with devices that are located on, within, or otherwise form a part of the oral care implement 100. In other embodiments, the electronic device 150 may be in operable communication with the oral care implement 100 and may store data and transmit user perceptible signals as indicators of various events to the user before, during, or after a brushing session.

Electronic components of the oral care implement 100 may include the processor 131 (e.g., programmable processor) and a plurality of sensors. The processor 131 may be programmed to process the sensor data. The sensors may include one or more micro-electro-mechanical system (MEMS) devices, microphones, interferometers, inertial measurement units (IMU), image sensors, and/or optical sensors. The sensor output may be received and processed by the processor 131 and communicated to an external device as further described herein. The MEMS device may include an accelerometer, a gyroscope, and a magnetometer, and may be included within and coupled to the handle 200 or other parts of the oral care implement 100.

Figure 6:
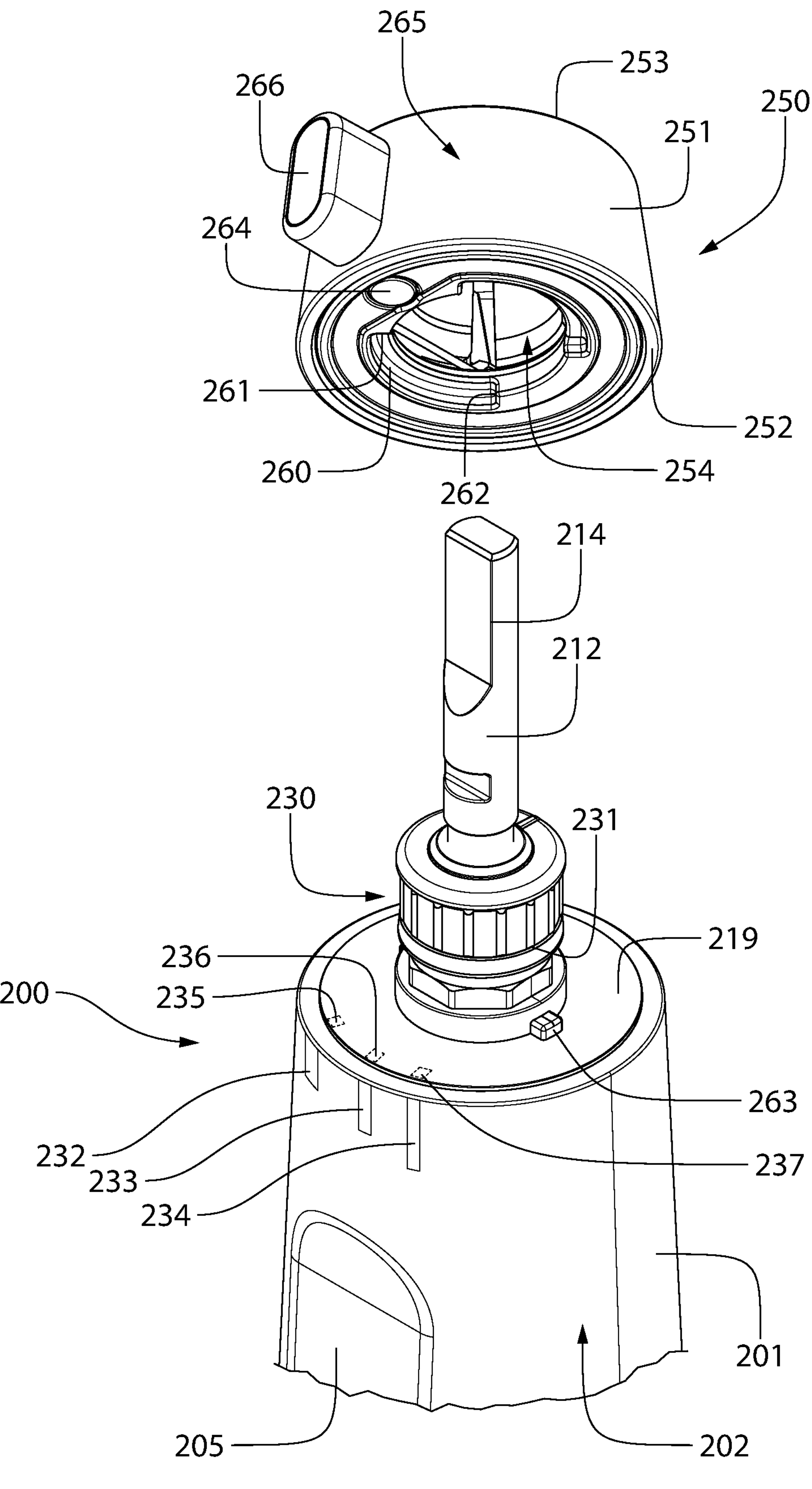
FIG. 6 is a partial perspective view of the oral care implement of FIG. 1 illustrating a mode selection unit exploded from a remainder of the handle.
Figure 8:
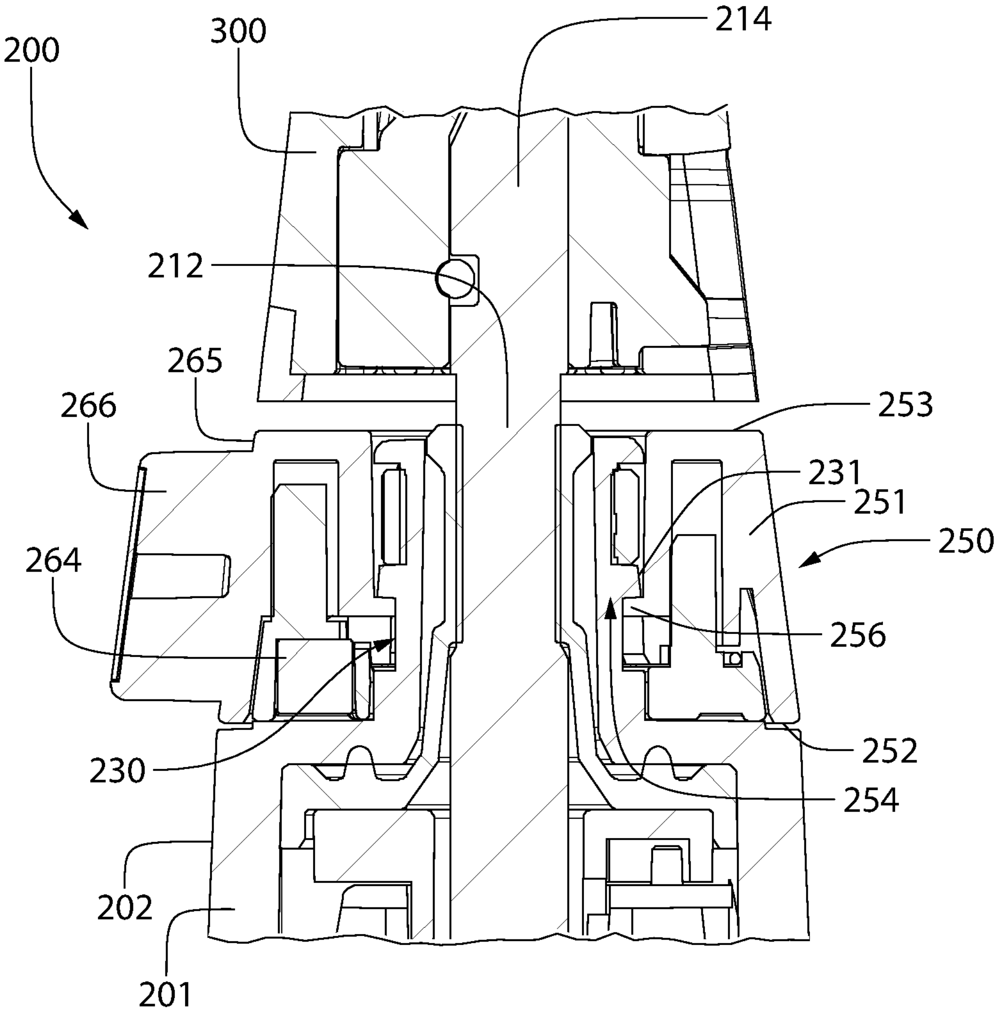
FIG. 8 is a cross-sectional view taken along line VIII-VIII of FIG. 7B.

Referring to FIGS. 6 and 8, the structure and operation of the mode selection unit 250 will be described in accordance with an embodiment of the present invention. As noted above, the mode selection unit 250 comprises the ring element 251 that is rotatably coupled to the gripping portion 201 of the handle 200. The gripping portion 201 of the handle 200 comprises a top end 219 that is opposite the bottom end 207. The ring element 251 may be coupled to the gripping portion 201 of the handle 200 adjacent to the top end 219 of the gripping portion 201. Alternatively, the ring element 251 may be coupled to the gripping portion 201 at other locations, such as at the bottom end, or at positions between the top and bottom ends. However, the positioning shown whereby the ring element 251 is located adjacent to the top end 219 of the gripping portion 201 may best lend itself to actuation by a user because it is near where the user's thumb is located when gripping the oral care implement 100 in a conventional manner. The ring element 251 may comprise a bottom end 252, a top end 253, and a through-hole 254 extending from the bottom end 252 to the top end 253. When the ring element 251 is coupled to the gripping portion 201 of the handle 200, the distal portion 214 of the drive shaft 212 may extend through the through-hole 254 of the ring element 251. The distal portion 214 of the drive shaft 212 may protrude beyond the top end 253 of the ring element 251.

The ring element 251 may comprise an inner surface 255 that defines the through-hole 254. The ring element 251 may comprise connection features 256 on its inner surface 255. The handle 200 may comprise a stem component 230 protruding from the top end 219 of the griping portion 201. The stem component 230 may comprise connection features 231 that are configured to be engaged with connection features 256 of the ring element 251 to facilitate an attachment between the ring element 251 and the gripping portion 201 of the handle 200. The connection features 231, 256 may prevent the ring element 251 from being detached from the gripping portion 201 by pulling the ring element 251 relative to the gripping portion 201 in an axial direction. However, the connection features 231, 256 may be engaged in a manner which allows the ring element 251 to rotate relative to the gripping portion 201. With the ring element 251 coupled to the gripping portion 201 to form the handle 200, the top end 253 of the ring element 251 may form the top end of the handle 200.

The inner surface 255 of the ring element 251 may comprise at least one recess 260 that extends between a first end wall 261 and a second end wall 262. The gripping portion 201 of the handle 200 may comprise at least one stop tab 263 protruding from the top end 219. When the ring element 251 is coupled to the gripping portion 201, the stop tab 263 may be located within the recess 260 of the ring element 251. The ring element 251 is then configured to rotate relative to the gripping portion 201 as noted above, such that the specific location of the stop tab 263 within the recess 260 changes as the ring element 251 rotates. The ring element 251 is therefore capable of rotating between a first end position whereby the stop tab 263 abuts against the first end wall 261 of the recess 260 and a second end position whereby the stop tab 263 abuts against the second end wall 262 of the recess 260. The ring element 251 may comprise a second recess and the gripping portion 201 may comprise a second stop tab that moves within the second recess in some embodiments. The ring element 251 may be prevented from rotating a full 360° due to the stop tab 263. The ring element 251 may be configured to rotate no more than 180°, or no more than 150°, or no more than 120° in various different embodiments depending on the number of different modes that the ring element 251 is designed to select from The mode selection unit 250 may comprise a lock magnet 264 located on or along the bottom end 252 of the ring element 251. The lock magnet 264 may have a first polarity. The mode selection unit 250 may further comprise an outer surface 265 and a mode selection protrusion 266 protruding from the outer surface 265. The mode selection protrusion 266 may be radially aligned with the lock magnet 264. The mode selection protrusion 266 may be elongated in a direction which is generally parallel to a longitudinal axis A-A of the oral care implement 100. When the ring element 251 is coupled to the gripping portion 201, the outer surface 265 of the ring element 251 may be flush with the outer surface 202 of the gripping portion 201.

The gripping portion 201 of the handle 200 may comprise a first mode indicia marking 232, a second mode indicia marking 233, and a third mode indicia marking 234. The first, second, and third mode indicia markings 232, 233, 234 may each extend along the outer surface of the gripping portion 201 from a position adjacent to the top end 219 downwardly towards the display portion 205. The first mode indicia marking 232 may have a first length, the second mode indicia marking 233 may have a second length, and the third mode indicia marking 234 may have a third length. The third length may be greater than the second length and the second length may be greater than the first length. Alternatively, the first, second, and third mode indicia markings 232, 233, 234 may have the same length and/or may differ from one another based on a characteristic other than length, such as color, thickness, or the like.

In an embodiment, a first mode magnet 235 may be located on or adjacent to the top end 219 of the gripping portion 201 in radial alignment with the first mode indicia marking 232, a second mode magnet 236 may be located on or adjacent to the top end 219 of the gripping portion 201 in radial alignment with the second mode indicia marking 233, and a third mode magnet 237 may be located on or adjacent to the top end 219 of the gripping portion 201 in radial alignment with the third mode indicia marking 234. Each of the first, second, and third mode magnets 235, 236, 237 may have a second polarity which is opposite to the first polarity of the lock magnet 264. Thus, if the lock magnet 264 has a negative polarity, then the first, second, and third mode magnets 235, 236, 237 may have a positive polarity, and vice versa. The magnetic attraction between the lock magnet 264 and each of the first, second, and third mode magnets 235, 236, 237 may help to maintain the ring element 251 of the mode selection unit 250 in a particular angular orientation relative to the gripping portion 201 to set (and hold/lock) the device into a particular mode for operation. The magnetic attraction does not prevent the user from changing the mode by rotating the ring element 251 relative to the gripping portion 201, but it provides some interference on free rotation of the ring element 251 without some user applied force. The magnetic attraction may provide a form of tactile feedback for the user to inform them of the change of mode.

The various magnets described herein may be omitted in some embodiments. In alternative embodiments, the ring element 251 and the stem component 230 or other portions of the gripping portion 201 may have teeth or other features which engage one another to allow the ring element 251 to click between the modes as it rotates relative to the gripping portion 201. This may provide a tactile indicator so that the user is made aware of the change in the mode. Other techniques for temporarily locking the ring element 251 in different angular positions associated with the different modes may be used in alternative embodiments.

Figures 7A, 7B, 7C:
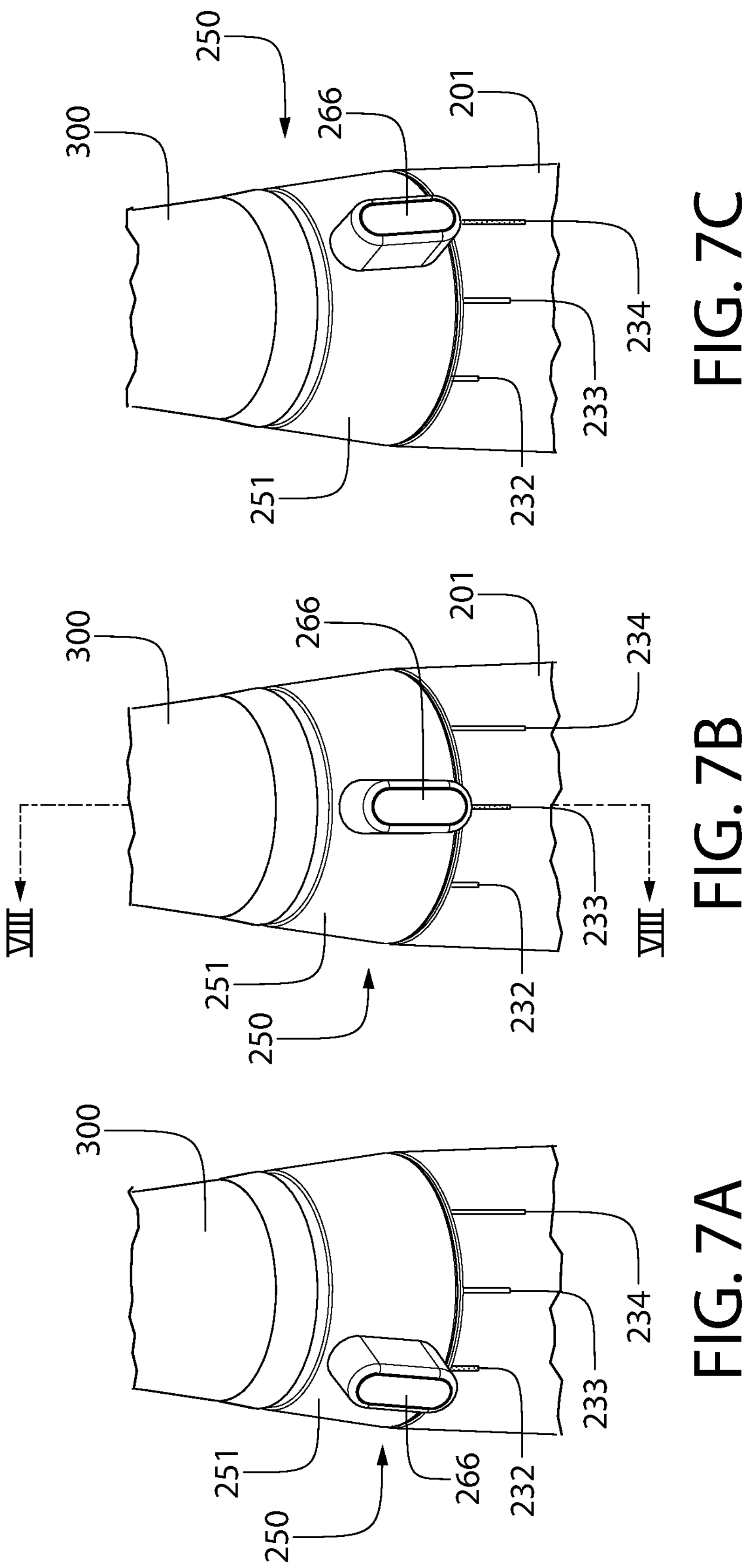
FIGS. 7A-7C are views of a portion of the oral care implement of FIG. 1 illustrating operation of the mode selection unit thereof to change a mode of operation of the oral care implement.

Referring to FIGS. 7A-7C, the rotation of the ring element 251 of the mode selection unit 250 between the various modes of operation is illustrated and will be described. In FIG. 7A, the mode selection protrusion 266 of the mode selection unit 250 is aligned with the first mode indicia marking 232. If the oral care implement 100 were powered on with the mode selection unit 250 in this position, the oral care implement 100 would operate in a first mode. In FIG. 7B, the mode selection protrusion 266 of the mode selection unit 250 is aligned with the second mode indicia marking 233. If the oral care implement 100 were powered on with the mode selection unit 250 in the position shown in FIG. 7B, the oral care implement 100 would operate in a second mode. In FIG. 7C, the mode selection protrusion 266 of the mode selection unit 250 is aligned with the third mode indicia marking 233. If the oral care implement 100 were powered on with the mode selection unit 250 in the position shown in FIG. 7C, the oral care implement 100 would operate in a third mode. The ring element 251 of the mode selection unit 250 rotates relative to the gripping portion 201 about the longitudinal axis A-A to move from the position shown in FIG. 7A to the position shown in FIG. 7B to the position shown in FIG. 7C (and from the position shown in FIG. 7C, to the position shown in FIG. 7B, to the position shown in FIG. 7A). The mode selection protrusion 266 is aligned with a particular one of the mode indicia markings 232, 233, 234 when an axis that is generally parallel to the longitudinal axis A-A intersects the mode selection protrusion 266 and the particular one of the mode indicia markings 232, 233, 234. The mode selected may be based on the circumferential positioning of the mode selection protrusion 266 about the handle.

When the oral care implement 100 is powered on in the first mode, the motion inducing unit 133 (e.g., the motor 211) may operate at a first speed. When the oral care implement 100 is powered on in the second mode, the motion inducing unit 133 (e.g., the motor 211) may operate at a second speed. When the oral care implement 100 is powered on in the third mode, the motion inducing unit 133 (e.g., the motor 211) may operate at a third speed. The third speed may be greater than the second speed and the second speed may be greater than the first speed. Thus, the first mode may be a gentle clean mode with the motor 211 operating at its slowest speed, the second mode may be a standard clean or daily clean mode with the motor 211 operating at its medium speed, and the third mode may be a deep clean mode with the motor 211 operating at its maximum speed.

While the above describes the different modes resulting in a different speed of operation for the motor 211, the invention is not to be so limited in all embodiments. In other embodiments, The different modes may represent a different mode of operation of the oral care implement which may include speed, although this is not required. In one embodiment, the motor 211 may oscillate back and forth when operating. In the different modes, the degree of the angular rotation of the motor 211 during this oscillation may change. For example, in the first mode the motor 211 may oscillate along a 30 degree arc, in the second mode the motor 211 may oscillate along a 60 degree arc, and in the third mode the motor 211 may oscillate along a 90 degree arc. Of course, the specific degrees of oscillation are not to be limiting of the invention. In some embodiments, the speed and the degrees at which the motor 211 oscillates may both be adjusted depending on the selected mode.

As noted previously, the oral care implement 100 may comprise a separate actuation element 206 for powering the oral care implement 100 on and off. That is, the actuation element 206 may be separate from the mode selection unit 250. Thus, the rotation of the ring element 251 may not power the oral care implement 100 on and off, but may instead simply set the mode at which the oral care implement 100 will operate when it is powered on. The user will separately activate the actuation element 206 to power the oral care implement 100 on and off, at which time the oral care implement 100, and more specifically the motor 211, will function in accordance with the selected mode. In other embodiments, a power button may be included on or along the ring element (for example, on the distal end of the mode selection protrusion 266), or the like.

In some embodiments, the mode selection unit 250 may not include a protrusion 266 like shown in the drawings. In alternative embodiments, the ring element 251 may comprise an indicia marking which is aligned with the various indicia markings 232, 233, 234 on the gripping element 201 to determine which mode is selected. The mode selection protrusion 266 may be useful in some embodiments to provide a gripping feature for a user to utilize to facilitate the rotation of the ring element 251 relative to the gripping portion 201 of the handle 200, but it is not required in all embodiments. In other embodiments, the mode selection unit 250 may include ribs, bumps, surface textures, or the like instead of the mode selection protrusion 266, or the ring element 251 may simply be smooth without any protrusion or surface textures.

The mode selection unit 250 may be located adjacent to the refill head 300 when the refill head 300 is coupled to the handle 200. The ring element 251 of the mode selection unit 250 may be located between the oral care refill head 300 and the actuation element 206 or between the oral care refill head 300 and the display portion 205. Other locations for the mode selection unit 250 are also possible, including along the bottom end of the gripping portion 201 of the handle 200, or at any location along the length of the gripping portion 201 of the handle 200. However, as mentioned above, the position as shown may be preferred as it is in a position that allows for easy access and adjustment by the user's thumb when gripping the handle 200 in a conventional manner.

Figure 9:
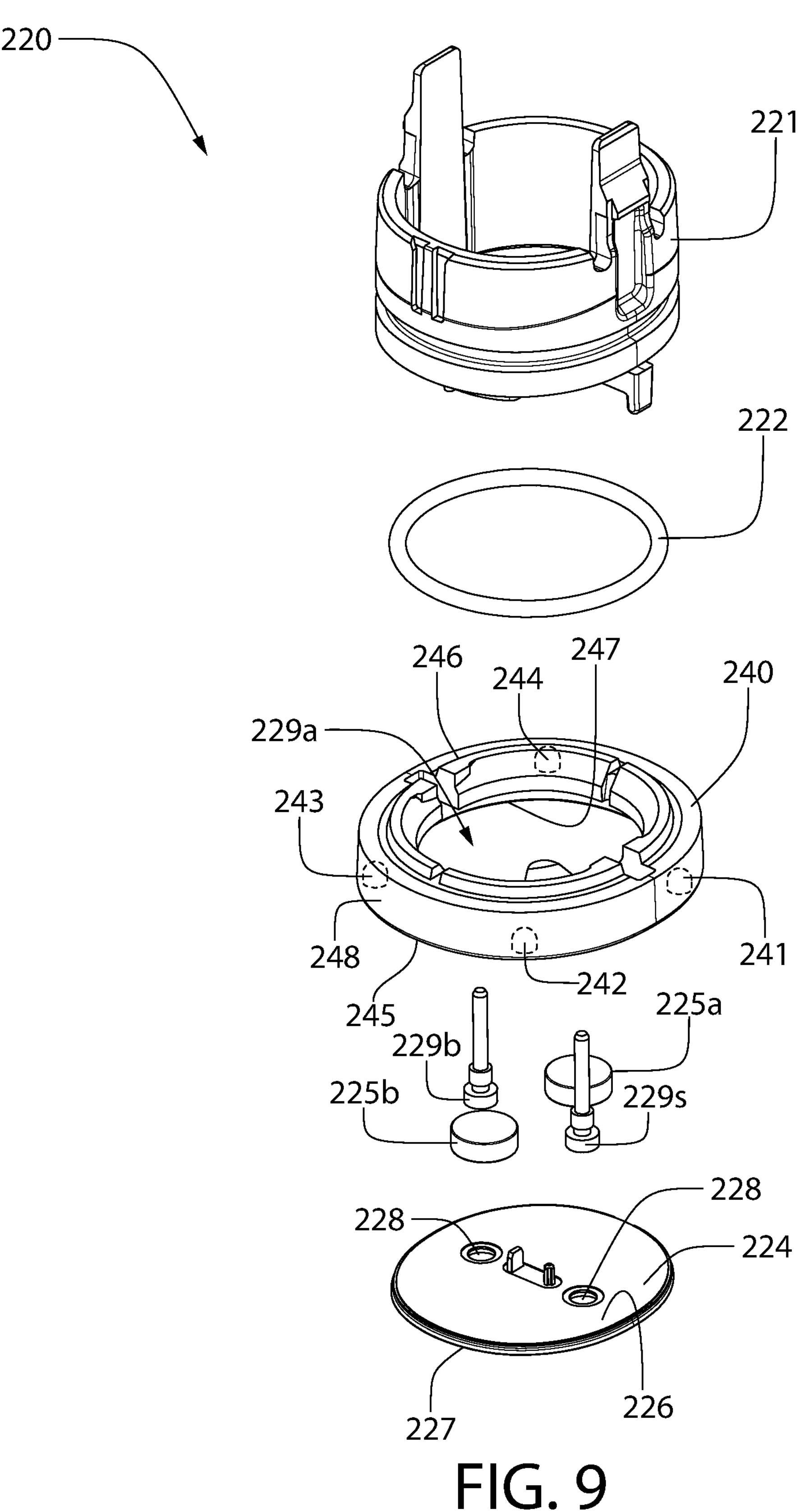
FIG. 9 is an exploded view of bottom end portion of the handle of the oral care implement of FIG. 1 which includes an illumination ring.

Referring to FIG. 9, the end cap 220 of the oral care implement 100 is illustrated in an exploded arrangement. The end cap 220 may comprise a support body 221 that at least partially nests within the handle cavity 204, a gasket or O-ring 222 that creates a tight fit between the support body 221 and the inner surface 203 of the handle 200 to prevent liquid from entering the handle cavity 204, an illumination ring 240, and a plate 224. The gasket 222 may be fitted within an annular groove formed into the exterior of the support body 221 so that the gasket 222 is in direct contact with the support body 221 and the inner surface 203 of the gripping portion 201 of the handle 200 when assembled (see FIG. 4). The end cap 220 may comprise a pair of magnets 225*a*, 225*b* which cooperate via magnetic attraction with magnets in the charger 20 to ensure that the oral care implement 100 and the charger 20 are properly aligned when coupled together, as described previously.

The plate 224 has an inner surface 226, an outer surface 227, and a pair of holes 228 extending from the inner surface 226 to the outer surface 227. Furthermore, there are a pair of electrical contact elements 229*a*, 229*b* that are aligned with and which may be at least partially positioned within the holes 228. When the oral care implement 100 is being charged by the charger 20, the pins 25 of the charger 20 extend into the holes 228 of the plate 224 and contact the electrical contact elements 229*a*, 229*b* to facilitate charging.

The illumination ring 240 may be a ring-shaped element having an inner surface 247 that surrounds a through-hole 249. The illumination ring 240 may be formed from a translucent or transparent material so that the illumination ring 240 can be illuminated to provide visual feedback to a user. The illumination ring 240 may comprise a bottom end 245, a top end 246, the inner surface 247, an outer surface 248, and the through-hole 249 extending between the bottom and top ends 245, 246. The through-hole 249 may be bounded by the inner surface 247.

The illumination ring 240 may have an interior within which a plurality of light sources 241, 242, 243, 244 are located. While four distinct light sources 241, 242, 243, 244 are illustrated in the exemplified embodiment, the invention is not to be limited by the specific number of light sources and more or less than four light sources 241, 242, 243, 244 could be used in other embodiments. The light sources 241, 242, 243, 244 are configured to illuminate portions of the illumination ring 240 when the light sources 241, 242, 243, 244 are illuminated or powered on. The time indicator unit 139 described above with reference to FIG. 5 may comprise the light sources 241, 242, 243, 244 such that the light sources 241, 242, 243, 244 may be illuminated sequentially to inform a user, during an oral care session, of intervals of time that have elapsed during performance of the oral care session.

While the light sources 241, 242, 243, 244 may be located within the interior of the illumination ring 240, the invention is not to be so limited in all embodiments. The light sources 241, 242, 243, 244 may be located at any position that would enable them to light up (i.e., illuminate) portions of the illumination ring 240 when powered. Thus, the light sources 241, 242, 243, 244 may be located on the interior surface 226 of the plate 224 in some embodiments, or at any other location which meets the requirements noted herein.

The illumination ring 240 may be coupled to the support body 221 via a friction fit, snap fit, or other type of arrangement. The plate 224 may be coupled to the illumination ring 240 and may close an open bottom end thereof. Thus, when the end cap 220 is coupled to the gripping portion 201 the end cap 220 may close the opening 208 in the bottom end 207 of the gripping portion 201 of the handle 200.

Referring to FIGS. 10A-10D, the illumination ring 240, when coupled to the gripping portion 201, forms a bottom-most portion of the handle 200. The plate 224 of the end cap 220 may form a bottom surface of the handle 200. The illumination ring 240 may surround the plate 224 and at least partially protrude from the outer surface 227 of the plate 224. That is, the plate 224 may nest within the through-hole 249 defined by the illumination ring 240 such that the plate 224, and more specifically the outer surface 227 of the plate 224, is recessed relative to the bottom end 245 of the illumination ring 240. The outer surface 248 of the illumination ring 240 may be flush with the outer surface 202 of the gripping portion 201 of the handle 200. As seen in these figures, the illumination ring 240 forms a bottom-most portion of the handle 200 which may be visible to a user in a mirror during an oral care session, or may simply be visible to a user during an oral care session due to its positioning furthest from the user's face during the oral care session.

The illumination ring 240 may be divided into a plurality of quadrants including a first quadrant 270, a second quadrant 271, a third quadrant 272, and a fourth quadrant 273. The first light source 241 may be located within the first quadrant 270 or otherwise positioned to illuminate the first quadrant 270 when powered on. The second light source 242 may be located within the second quadrant 271 or otherwise positioned to illuminate the second quadrant 271 when powered on. The third light source 243 may be positioned within the third quadrant 272 or otherwise positioned to illuminate the third quadrant 272 when powered on. The fourth light source 244 may be positioned within the fourth quadrant 273 or otherwise positioned to illuminate the fourth quadrant 273 when powered on. Each of the first, second, third, and fourth light sources 241, 242, 243, 244 may comprise one or more light emitters, such as light emitting diodes or the like. The illumination ring 240 may comprise opaque dividers between each of the four quadrants 270-273 so that the first light source 241 can only illuminate the first quadrant 270 and is prevented from illuminating any of the other quadrants 271-273, the second light source 242 can only illuminate the second quadrant 271 and is prevented from illuminating any of the other quadrants 270, 272, 273, the third light source 243 can only illuminate the third quadrant 272 and is prevented from illuminating and of the other quadrants 270, 271, 273, and the fourth light source 244 can only illuminate the fourth quadrant 273 and is prevented from illuminating any of the other quadrants 270, 271, 272. That is, each of the light sources 241-244 may be capable of illuminating only one of the quadrants with the divider walls preventing light from passing from one of the quadrants to another.

Referring to FIGS. 5 and 10A-10D, the oral care implement 100 will be further described. The timer unit 138 tracks the amount of time elapsed during an oral care session and transmits that information (either directly or indirectly via the processor) to the time indicator unit 139. As noted, the time indicator unit 139 may comprise the first, second, third, and fourth light sources 241, 242, 243, 244. The control circuit, which may comprise the processor 131, is configured to activate the time indicator unit (e.g., the first, second, third, and fourth light sources 241, 242, 243, 244) to illuminate the illumination ring 240 in a manner that informs the user, during the oral care session, of intervals of time that have passed/elapsed during performance of the oral care session. The timer unit 138 may start tracking time as soon as the oral care implement is powered on (such as by activating the actuation element 206) or as soon as the user contacts the teeth with the oral care tool 310. The control circuit (for example, the processor 131), may be configured to activate the time indicator unit 139 in a manner that sequentially illuminates segments of the illumination ring 240. The segments may be the quadrants 270, 271, 272, 273, although the segments could be divided into more or less than four segments in other embodiments.

Figure 10A:
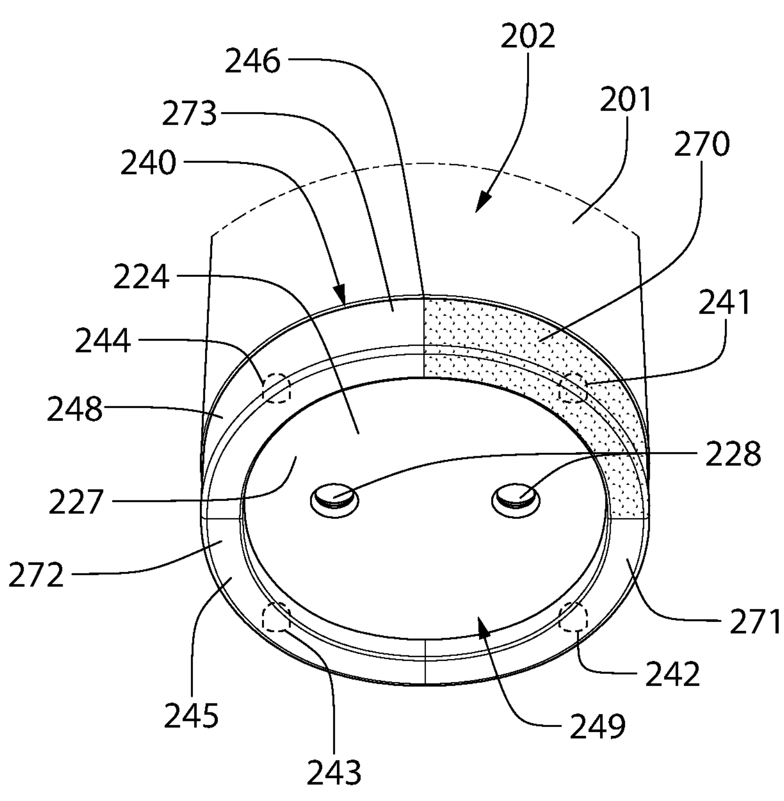
FIGS. 10A-D are views of the bottom end portion of the handle illustrating progressive illumination of the illumination ring thereof over the passage of time.
Figure 10B:
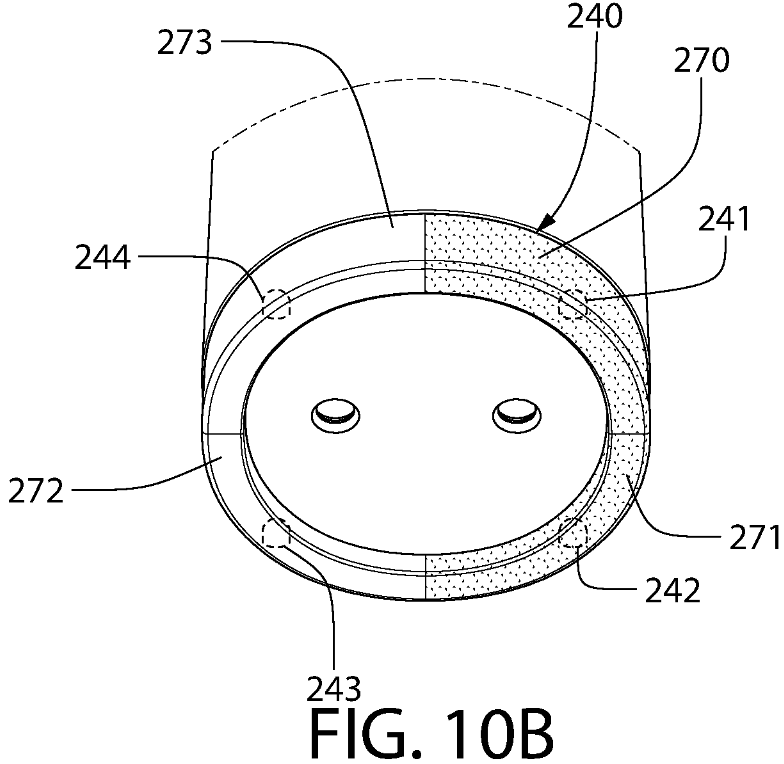
Figures 10C, 10D:
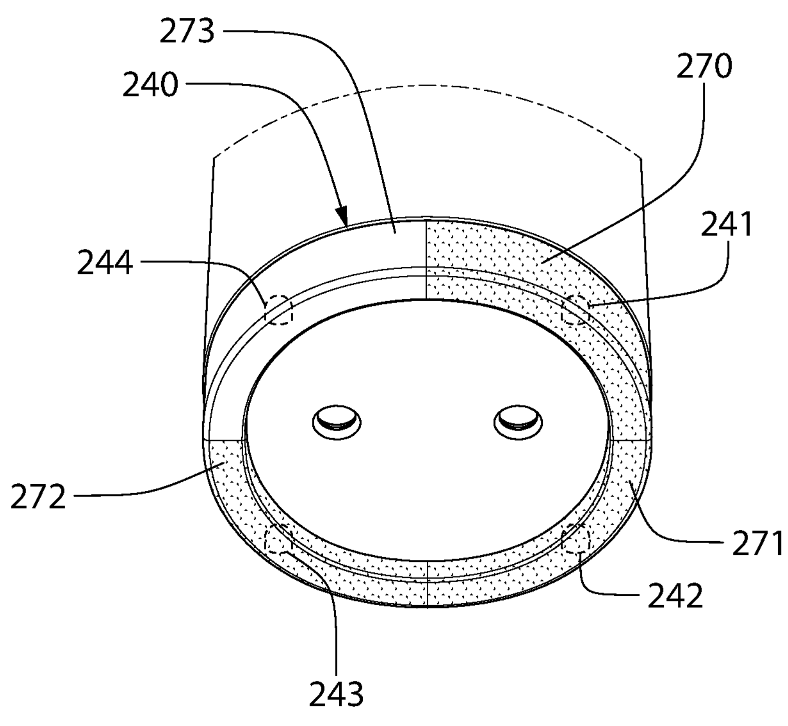

FIG. 10A illustrates the first quadrant 270 of the illumination ring 240 being illuminated. During a first time period of an oral care session (for example, the time period encompassing 0-30 seconds after initiation of the oral care session), the time indicator unit 139 is configured to illuminate the first quadrant 270 of the illumination ring 240 by illuminating or activating the first light source 241. Once the first quadrant 270 is illuminated, it remains that way until the end of the oral care session. FIG. 10B illustrates the first and second quadrants 270, 271 of the illumination ring 240 being illuminated. During a second time period of the oral care session (for example, the time period encompassing 30-60 seconds after initiation of the oral care session), the time indicator unit 139 is configured to illuminate the first and second quadrants 271 of the illumination ring 240 by illuminating or activating the second light source 242 (the first light source 241 having been previously illuminated or activated). Once the second quadrant 271 is illuminated, it remains that way until the end of the oral care session. FIG. 10C illustrates the first, second, and third quadrants 270, 271, 272 of the illumination ring 240 being illuminated. During a third time period of the oral care session (for example, the time period encompassing 60-90 seconds after initiation of the oral care session), the time indicator unit 139 may be configured to illuminate the first, second, and third quadrants 270-272 of the illumination ring 240 by illuminating or activating the third light source 243 (the first and second light sources 241, 242 having been previously illuminated or activated). Once the third quadrant 272 is illuminated, it remains that way until the end of the oral care session. FIG. 10D illustrates the first, second, third, and fourth quadrants 270, 271, 272, 273 of the illumination ring 240 being illuminated. During a fourth time period of the oral care session (for example, the time period encompassing 90-120 seconds after initiation of the oral care session), the time indicator unit 139 may be configured to illuminate the first, second, third, and fourth quadrants 270-273 of the illumination ring 240 by illuminating or activating the third light source 244 (the first, second, and third light sources 241-243 having been previously illuminated or activated. Thus, the quadrants 270-273 (or segments which may be any number of segments as desired) are sequentially illuminated during the oral care session.

In an embodiment, after expiration of the fourth time period, the illumination ring 240 may flash or pulse to alert the user to the completion of the allotted time period for the full oral care session. In particular, the processor 131 may be configured to activate the time indicator unit 139 to illuminate the illumination ring 240 in a flashing sequence. The motion inducing unit 133 may also perform an extended vibration cycle to provide a tactile indication to the user of the completion of the time period allotted for the full oral care session. Each of the first, second, third, and fourth light sources 241-244 may illuminate in a white color to illuminate the illumination ring 240 in a white color to indicate intervals of time during the oral care session. Alternatively, the first, second, third, and fourth light sources 241-244 may illuminate in a non-white color, such as blue, purple, green, or the like. In one embodiment, the first, second, third, and fourth light sources 241-244 may illuminate in the same color, and in other embodiments they may illuminate in colors that differ from one another.

Figure 11:
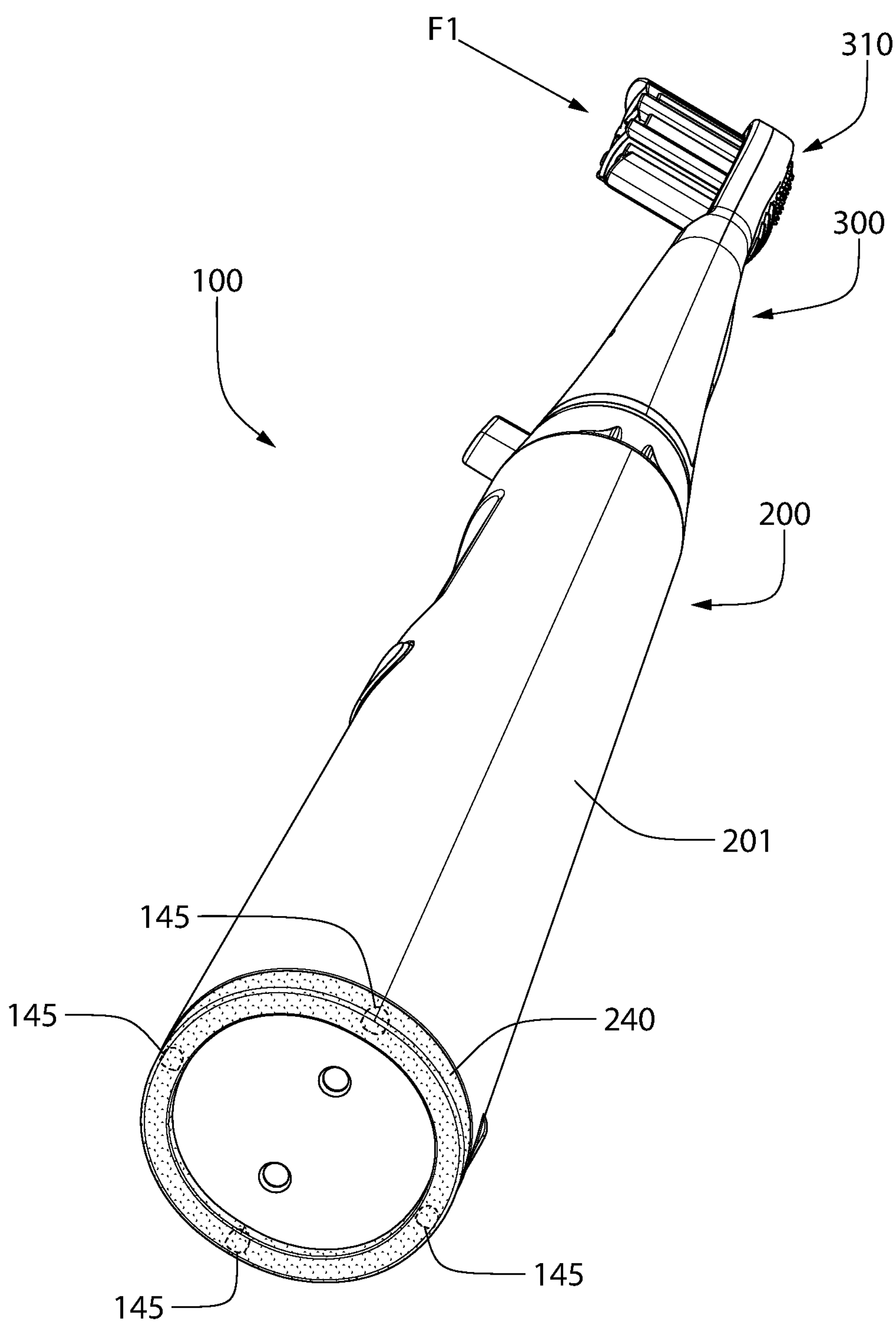
FIG. 11 is a perspective view of the oral care implement of FIG. 1 illustrating the illumination ring being illuminated in response to excess pressure being applied onto the head.

Referring now to FIGS. 5 and 11, details related to the pressure sensor 140 and the pressure indicator unit 141 will be described. As noted previously, the pressure sensor 140 is configured to determine whether an amount of pressure being applied onto the oral care tool 310 during performance of the oral care session excess a pressure threshold. It is known that applying too much pressure with the oral care tool 310 during an oral care session such as toothbrushing can cause damage to the user's gums and other oral cavity surfaces. Thus, there is desire to inform a user when they are performing the oral care session with too much pressure to provide them with an opportunity to make adjustments that will benefit the user's oral care health.

As shown in FIG. 11, when a pressure (or force) F1 applied onto the oral care tool 310 exceeds a predetermined threshold (which may be preset by the manufacturer and may be adjustable by the user), the control circuit (e.g., the processor 131) may be configured to activate the pressure indicator unit 141 to illuminate the illumination ring 240. In the exemplified embodiment, the pressure indicator unit 141 may comprise one or more light sources 145 arranged within, along, or adjacent to the illumination ring 240. The exact position or location of the one or more light sources 145 is not limiting of the invention described herein so long as illumination/activation of the one or more light sources 145 results in the illumination ring 240 being illuminated. The one or more light sources 145 of the pressure indicator unit 141 may be distinct from the one or more light sources 241-244 associated with the time indicator unit 139. Alternatively, the one or more light sources 145 may be the same as the one or more light sources 241-244, except configured to illuminate in a different color depending on whether it is activated due to a time threshold or a pressure threshold.

In the exemplified embodiment, upon the pressure applied onto the oral care tool 310 exceeding the predetermined threshold, all of the one or more light sources 145 are configured to illuminate at the same time, thereby illuminating the entirety of the illumination ring 240. This differs from the illumination of the one or more light sources 241-244, which is achieved sequentially to serve as an indicator of intervals of time elapsed. In an embodiment, the light sources 241-244 associated with the time indicator unit 139 may illuminate in a first color (e.g., white) and the one or more light sources 145 associated with the pressure indicator unit 141 may illuminate in a second color (e.g., red) with the second color being different than the first color. While example colors (white and red) are provided, the specific colors used may differ and can be any desired color.

In one embodiment, activation of the pressure indicator unit 141 when the pressure sensor detects that the pressure being applied during the oral care session exceeds the predetermined threshold takes precedence over or overrides the time indicator unit 139. Thus, during an oral care session, the time indicator unit 139 will illuminate the illumination ring 240 in the first color in a sequential manner indicative of the elapse of various intervals of time. If at any time during the oral care session the pressure sensor 140 detects that the pressure being applied onto the oral care tool 310 exceeds the predetermined threshold, the processor 131 will cause the pressure indicator unit 141 to activate while deactivating the time indicator unit 139. Thus, during excess pressure conditions, the pressure indicator unit 141 will be activated to illuminate the one or more light sources 145 as described herein and the time indicator unit 139 will be deactivated. As soon as the excess pressure condition is remedied, the processor 131 may be configured to deactivate the pressure indicator unit 141 and reactive the time indicator unit 139. Upon reactivation of the time indicator unit 139, the time indicator unit 139 will activate all of the required ones of the light sources 241-244 to reflect the current amount of elapsed time.

For example, if an excess pressure condition is detected at time 15 seconds into the oral care session, at that time only the first quadrant 270 of the illumination ring 240 would have been illuminated. Upon the excess pressure condition being detected, the time indicator unit 139 may be deactivated and the pressure indicator unit 141 may be activated to illuminate the one or more light sources 145. If the excess pressure condition is not remedied until time 35 seconds into the oral care session, upon such remedy the pressure indicator unit 141 may be deactivated and the time indicator unit 139 may be reactivated. Such reactivation of the time indicator unit 139 may include activating/illuminating the first and second light sources 141, 142 since the time is now in the 30-60 second time interval during which the first and second quadrants 270, 271 of the illumination ring 240 are illuminated.

Thus, the same illumination ring 240 may be used to indicate time intervals during the oral care session and excess pressure conditions during the oral care session. The illumination ring 240 may be illuminated sequentially (by quadrant or the like) in a first color to indicate intervals of time elapsed. The illumination ring 240 may be illuminated entirely (i.e., all segments/quadrants illuminated simultaneously) in a second color to indicate that excess pressure is being applied. The illumination ring 240 may return to being illuminated in the first color in accordance with the current time interval once the excess pressure condition is remedied. The illumination ring 240 may be located at the bottom end of the handle 200 for easy visibility by the user.

Figure 12:
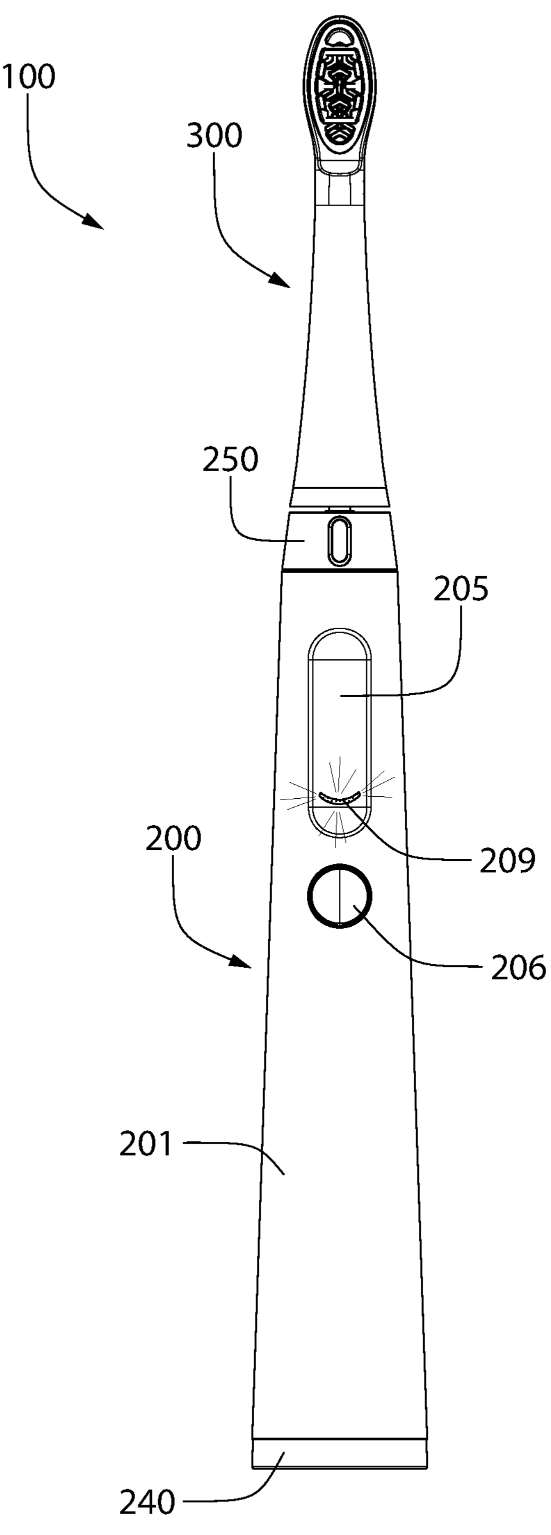
FIG. 12 is a front view of the oral care implement of FIG. 1 illustrating trend indicator unit generating a user perceptible stimuli
Figure 13:
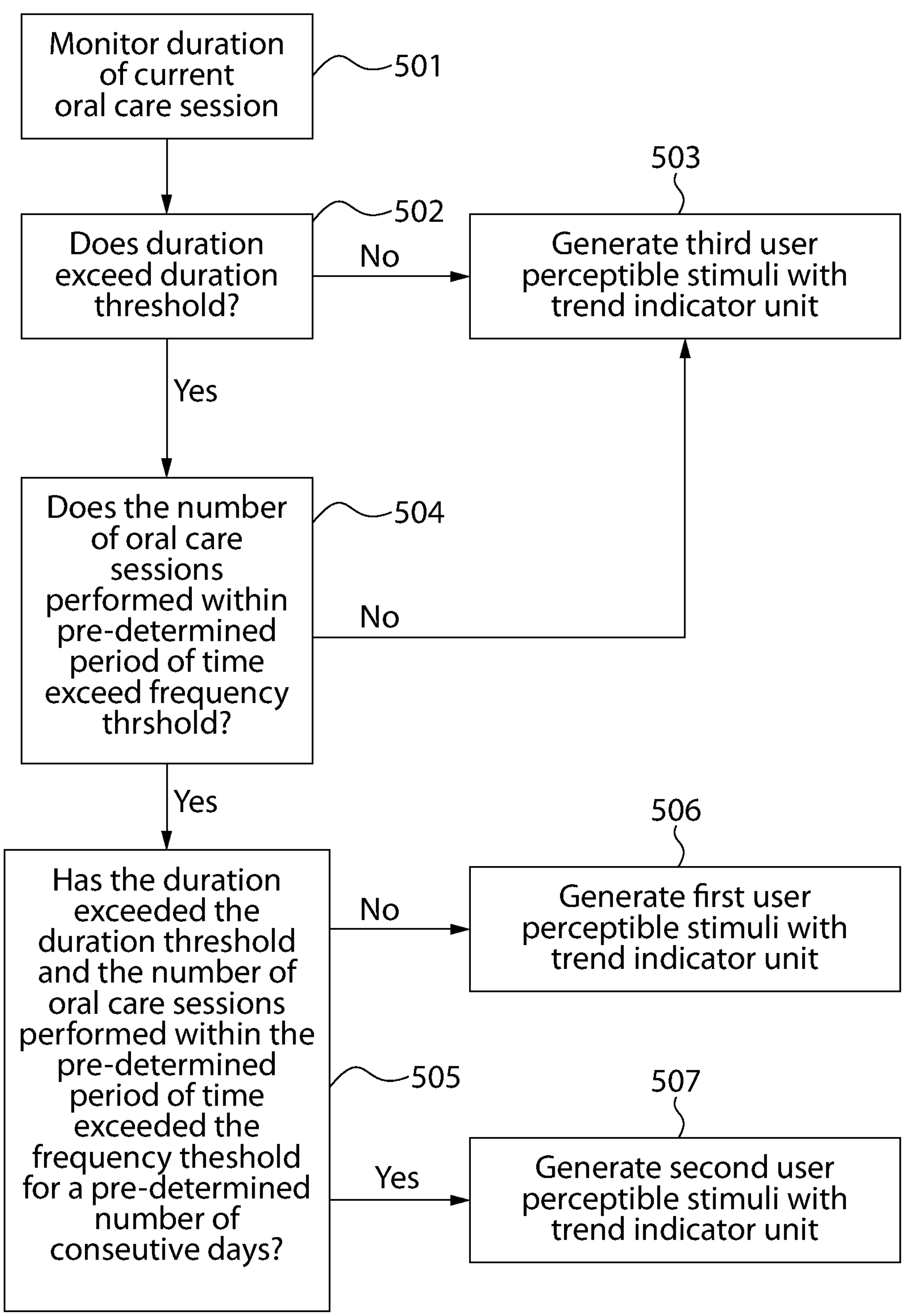
FIG. 13 is a flow chart illustrating a functionality of a trend tracking unit and the trend indicator unit to track a user's use trends associated with the oral care implement.

Referring to FIGS. 5, 12, and 13, the oral care implement 100 will be further described with a specific focus on the function of the trend tracking unit 136 and the trend indicator unit 137. As noted above, the trend indicator unit 137 may comprise the visible feedback element 209 which is illuminated on the display portion 205 of the gripping portion 201 of the handle 200. In particular, the trend indicator unit 137 may comprise one or more light sources, such as light emitters or the like which illuminate to form the visible feedback element 209 on the display portion 205. The light sources associated with the trend indicator unit 137 may be located on the circuit board 290 to project through the display portion 205 (in which case the display portion 205 may be translucent or transparent or otherwise light transmissible) or they may be formed as part of the display portion 205. In either case, the trend indicator unit 137 may comprise a visual feature, such as the visual feedback element 209, which is illuminated or visible at various times as described below. The trend indicator unit 137 may be configured to illuminate the visible feedback element 209 in different ways (different symbols, different graphics, or the same symbol like the "smile" feature in a different color, which is what will be described in accordance with the exemplified, but non-limiting embodiment).

As noted above, the trend tracking unit 136 monitors: (1) a duration of each oral care session; and (2) a number of the oral care sessions performed within a predetermined period of time. As also mentioned above, the predetermined period of time may be in a range of 18 hours to 24 hours. Alternatively, the predetermined period of time may be a single calendar day. The predetermined period of time may be calculated on a daily basis. Specifically, the goal of this feature may be to determine whether the user brushes their teeth at least two times (as recommended by a dentist) on any given single calendar day. So, on a given single calendar day, the trend tracking unit 136 may start a clock upon completion of a first brushing session on that particular day. The trend tracking unit 136 may then count the number of oral care sessions that are performed on that same calendar day. The trend tracking unit 136 may count the number of oral care sessions that are performed within the predetermined period of time (i.e., within the 18-24 hour period of time, for example). In other embodiments, the trend tracking unit 136 may not have to start a clock. Instead, the trend tracking unit 136 may simply determine how many times the user performed an oral care session on each calendar day.

In the exemplified embodiment, the visible feedback element 209 is illuminated in the arcuate/smile formation as shown with varying colors to indicate different information to a user. In an embodiment, the visible feedback element 209 may illuminate in a specific color upon powering the oral care implement 100 on. In an alternative embodiment, the visible feedback element 209 may illuminate in a specific color upon completion of an oral care session using the oral care implement 100.

Referring in particular to FIG. 13, the operation of the trend tracking and trend indicator units 136, 137 will be described in accordance with an exemplary embodiment of the present invention. First, the oral care implement 100 is powered on and a user begins an oral care session therewith. The oral care session may be a toothbrushing session or some other oral care treatment. At step 501, the trend tracking unit 136 monitors a duration of a current oral care session being performed with the oral care implement 100. Thus, the trend tracking unit 136 may start a clock or stopwatch or the like upon initiating of the oral care session until completion, which may be determined by the user powering the oral care implement 100 off or by the oral care tool 310 no longer being located in the user's oral cavity, or the like. Next, the operation moves to step 502 where it is determined whether the duration of the current oral care session exceeds a duration threshold. The duration threshold may be two minutes in some embodiments, which is the dentist recommended time period for a toothbrushing session. The duration threshold may be other time periods as desired to achieve a particular purpose. For example, some users may require more time to adequately clean their teeth or otherwise complete their oral care session and thus the duration threshold may be more or less than two minutes in some embodiments. Step 502 may be achieved continuously during the oral care session or step 502 may be performed upon the current oral care session being ended (such as by the user powering down the oral care implement 100).

If the duration of the current oral care session does not exceed the duration threshold, the operation moves to step 503. At step 503, the trend indicator unit 137 generates a third user perceptible stimuli. In particular, the control circuit (e.g. the processor 131) may assess the duration at step 502 and if the duration does not exceed the duration threshold the processor 131 may activate the trend indicator unit 137 to generate the third user perceptible stimuli. The third user perceptible stimuli may be a sound pattern, a vibration pattern, or a visual feature. In one embodiment, the third user perceptible stimuli may be the visual feedback element 209 being illuminated in a third color. In some embodiments, the third color may be a neural color, such as white. If the duration does not exceed the duration threshold, this means that the user has not performed the oral care session for the preferred amount of time. Thus, the third user perceptible stimuli reflects this failure. Nonetheless, in one embodiment the third color is preferably not a color with a negative association such as red. Rather, the third color may be white which has positive associations because even if the user falls a little short on a given day, there may be a desire to avoid providing the user with feedback which may make them anxious such as a red color. Of course, in other embodiments the third color may be red if so desired.

If the duration of the current oral care session exceeds the duration threshold, then the operation moves to step 504. At step 504, the control circuit (e.g., the processor 131) determines whether the number of oral care sessions performed within a predetermined period of time exceed a frequency threshold. As noted above, the predetermined period of time may be a single calendar day. Alternatively (or additionally), the predetermined period of time may be a set number of hours, such as 18 hours, or 24 hours, or any time in between. As also noted above, the frequency threshold may be two (dentists recommend that users brush their teeth twice daily), although the frequency threshold may be more or less than two in other embodiments.

In the exemplified embodiment, if the control circuit (e.g., the processor 131) determines that the number of oral care sessions performed within the predetermined period of time does not exceed the frequency threshold, the operation may return to step 503 and the control circuit (e.g., the processor 131) may activate the trend indicator unit 137 to generate the third user perceptible stimuli, which was discussed in detail above. Thus, in accordance with the exemplified embodiment, if the duration of the current oral care session does not exceed the duration threshold (e.g., two minutes) and/or if the number of the oral care sessions performed within the predetermined period of time (e.g., a single calendar day) does not exceed the frequency threshold (e.g., two), the trend indicator unit 137 will generate the third user perceptible stimuli.

In another embodiment, if the duration exceeds the duration threshold but the number of oral care sessions performed within the predetermined period of time does not exceed the frequency threshold, a fourth user perceptible stimuli may be generated with the trend indicator unit 137. The fourth user perceptible stimuli may comprise illuminating the visible feedback element 209 in a fourth color which differs from the third color. Alternatively, the fourth user perceptible stimuli could be a sound, a vibration, or the like. This would let the user know that while the current oral care session was performed for a sufficient duration, the user has not yet performed the required number of oral care sessions for that particular time period (e.g., a single calendar day).

A first set of parameters may comprise: (1) the duration of a current oral care session performed using the oral care implement exceeding a duration threshold; and (2) the number of the oral care sessions performed within the predetermined period of time (e.g., within the single calendar day) meeting or exceeding a frequency threshold.

If the number of the oral care sessions performed within the pre-determined period of time (e.g., a single calendar day) exceeds the frequency threshold (e.g., 2) the operation moves to step 505. At step 505 it is determined whether the first set of parameters have been met for a predetermined number of consecutive days. That is, at step 505, if the duration of the current oral care session performed using the oral care implement exceeds the duration threshold and the number of oral care sessions performed within a predetermined period of time (e.g., within a single calendar day) meets or exceeds the frequency threshold, it is determined (by the control circuit, and for example by the processor 131) whether this has occurred for a predetermined number of consecutive days. The predetermined number of consecutive days may be two days, or three days, or four days, or five days, or six days, or seven days, or other numbers of days as determined by the manufacturer or the end user. In an embodiment, the predetermined number of consecutive days may be adjustable by the user or by an artificial intelligence algorithm which is tailored to a particular user's brushing habits and trends over time.

If the first set of parameters has been met, but not for the predetermined number of consecutive days, the process moves to step 506. Thus, if the first set of parameters has been met for a number of days which is less than the predetermined number of consecutive days, the control circuit (e.g., the processor 131) may initiate or activate the trend indicator unit 137 to generate a first user perceptible stimuli. The first user perceptible stimuli may be different from the third and fourth user perceptible stimuli. The first user perceptible stimuli may be a visual stimuli, an auditory stimuli, and/or a tactile stimuli. In an embodiment, the first user perceptible stimuli may comprise illuminating the visual feedback element 209 in a first color. The first color may be a solid color, such as blue or green or the like. The first color may be a different color than the third and fourth colors noted above.

If the first set of parameters has been met for the predetermined number of consecutive days, the process moves to step 507. At step 507, the control circuit (e.g., the processor 131) may initiate or activate the trend indicator unit 137 to generate a second user perceptible stimuli. The second user perceptible stimuli may be different from each of the first, third, and potentially fourth user perceptible stimuli. The second user perceptible stimuli may be a visual stimuli, an auditory stimuli, and/or a tactile stimuli. In an embodiment, the second user perceptible stimuli may comprise illuminating the visual feedback element 209 in a second color. The second color may be a solid color which is different from the first, third, and fourth colors. In one embodiment, the second color may be a rainbow color such that portions of the visual feedback element 209 illuminates in a plurality of different colors simultaneously. In another embodiment, the second color may comprise the visual feedback element 209 flashing through a color sequence such that the color of the visual feedback element 209 changes and alters through a sequence of colors. For example, the visual feedback element 209 may illuminate in a sequence of colors, one at a time, with the sequence of colors including any of two or more of the following: white, purple, pink, red, orange, teal, yellow, etc. The visual feedback element 209 may be illuminated with any given color of the color sequence for a short period of time, for example one-half of a second, or a second, or the like, and then change to the next color in the sequence, although the exact time period that the visual feedback element 209 is illuminated with each color is not limiting in accordance with all embodiments.

Thus, if it is determined that a user has met the first set of parameters for a predetermined number of consecutive days, the visual feedback element 209 may illuminate in the second color (which may be a sequence of colors as noted above) to indicate that the user is on a brushing streak (or other oral care activity streak). This means the user has satisfied the first set of parameters for several days in a row so they are meeting their toothbrushing goals for several consecutive days. It may be a goal for a user to keep the visual feedback element 209 illuminated in the second color (or set of colors associated with the second user perceptible stimuli) to reflect that the user has been achieving the preset goals for his or her oral care sessions for consecutive days. This may encourage the user to perform the oral care sessions with consistency to obtain the reward of the rainbow colored illumination of the visual feedback element 209 or other visual, auditory, or tactile recognition of the achievement. As soon as the user fails to perform an oral care session for the duration threshold or fails to perform the number of oral care sessions within a single calendar day or other predetermined period of time which exceeds the frequency threshold, the trend indicator unit will no longer generate the second user perceptible stimuli but will instead generate one of the first, third, or fourth user perceptible stimuli in accordance with the process and operation discussed herein.

Thus, it should be appreciated that the visual feedback element 209, which may be referred to as a "smile light," may be configured to illuminate in different colors or change colors before, during, or after an oral care session to visually indicate to the user that certain behaviors, patterns, and/or consistent habits have been performed successfully. The visual feedback element 209 may comprise a light emitter (e.g., an LED) disposed within the handle 200. Such a light emitter may be visible through a translucent or transparent portion of the handle 200 (such as the display portion 205) and operably coupled to the processor 131. In one instance, for example, the visual feedback element 209 might turn one color for successful completion of a full two-minute oral care session, another color for a successful completion to two full two-minute brushing sessions in one day, still another color for a brushing streak (e.g., 7 straight days of two oral care sessions of two-minutes per day). Other colors and associated performances are conceivable and the embodiment is not limited by the type or number of potential options.

In some embodiments, the visible feedback element 209 may illuminate in still further colors to indicate different operation characteristics or features to a user. For example, the visual feedback element 209 may illuminate in a fifth color when a charge of the power source 213 is below a power threshold to reflect a low battery condition. The fourth color may be a solid color such as orange in one particular embodiment. The visible feedback element 209 may illuminate in a sixth color when the power source 213 is being charged (such as by the oral care implement 100 being coupled to the charger 20) during a time period when the first set of parameters has not been met for the predetermined number of consecutive days. The sixth color may be white in one particular embodiment. The visible feedback element 209 may illuminate in a seventh color when the power source 213 is being charged during a time period when the first set of parameters has been met for the predetermined number of consecutive days (i.e., when the user is on a brushing streak). The seventh color may be green in one particular embodiment. The visible feedback element 209 may illuminate in an eighth color when the oral care implement 100 is Bluetooth connected to an electronic device, such as the electronic device 150 described with reference to FIG. 5. The eighth color may be blue and it may be a solid or flash.

Figure 14:
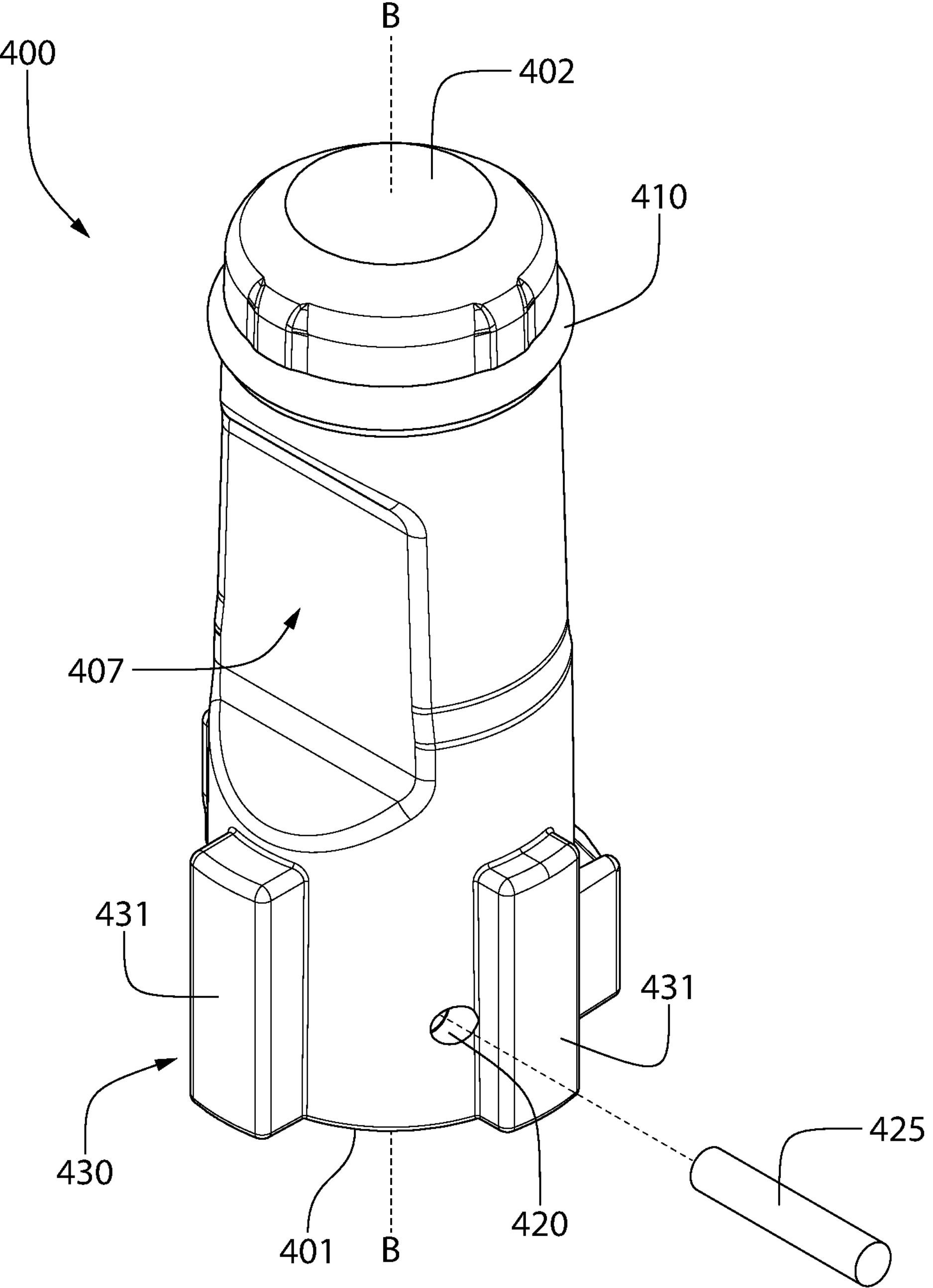
FIGS. 14 and 15 are perspective views of an adaptor that is configured to facilitate attachment of the refill head to the handle.
Figure 15:
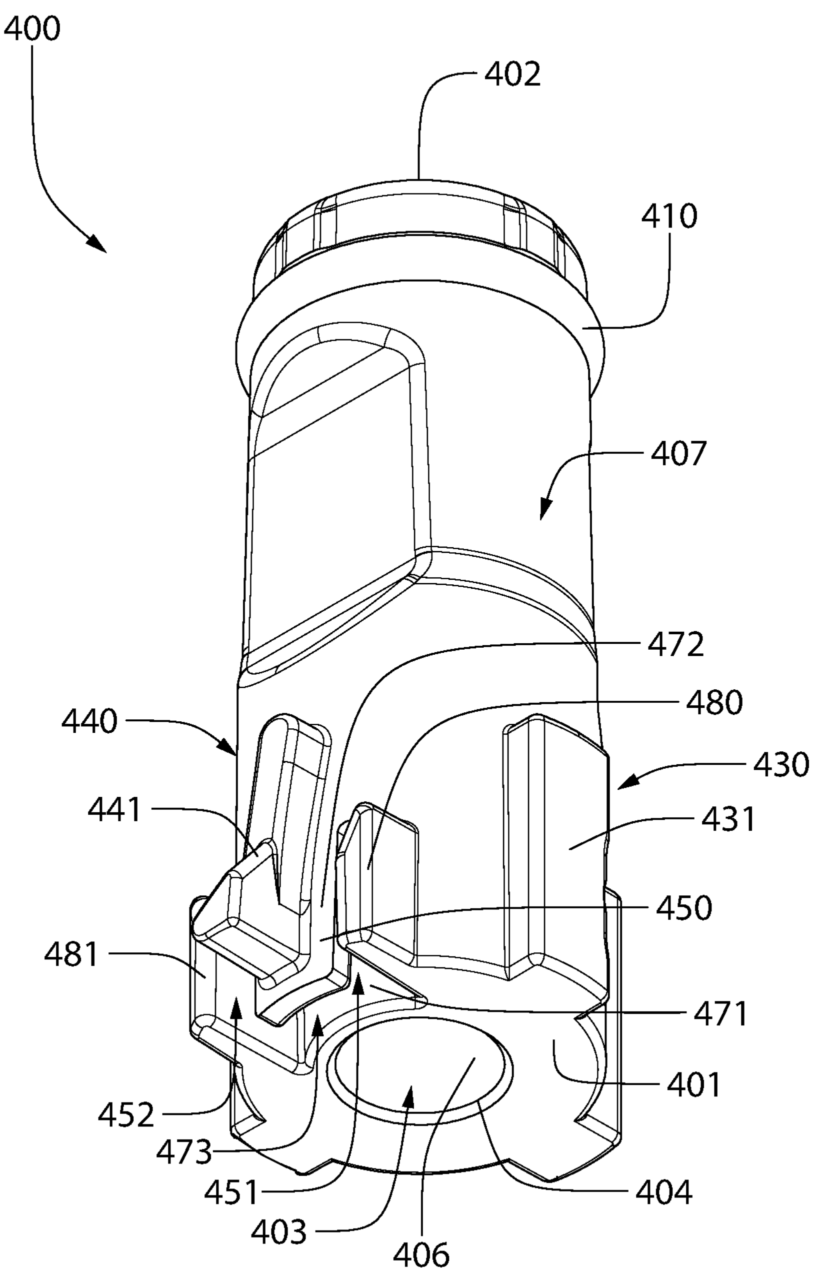
Figure 16:
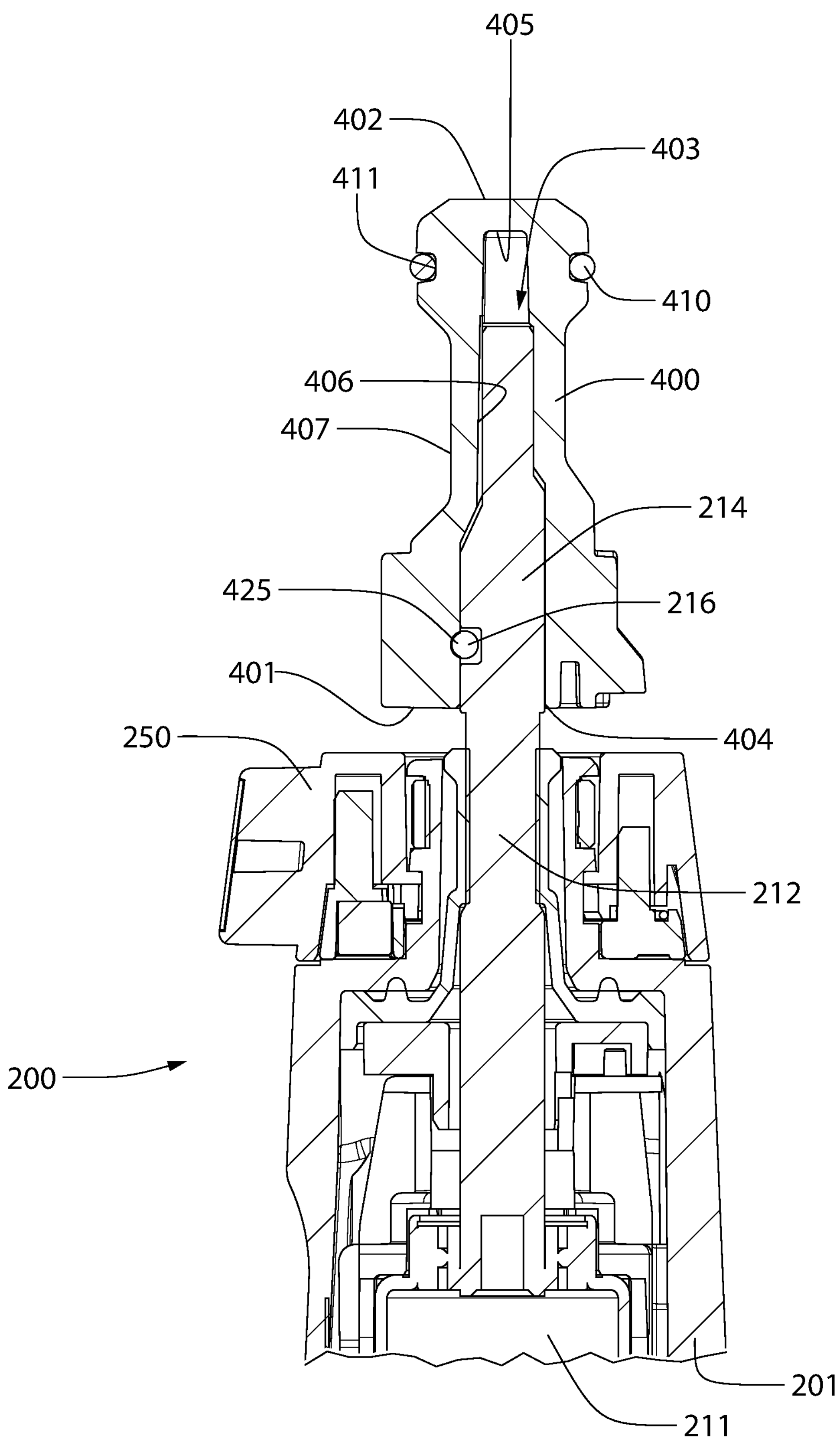
FIG. 16 is a cross-sectional view taken along line XVI-XVI of FIG. 2 illustrating the adaptor of FIGS. 14 and 15 coupled to a drive shaft of a motor that is located in the handle.
Figure 17:
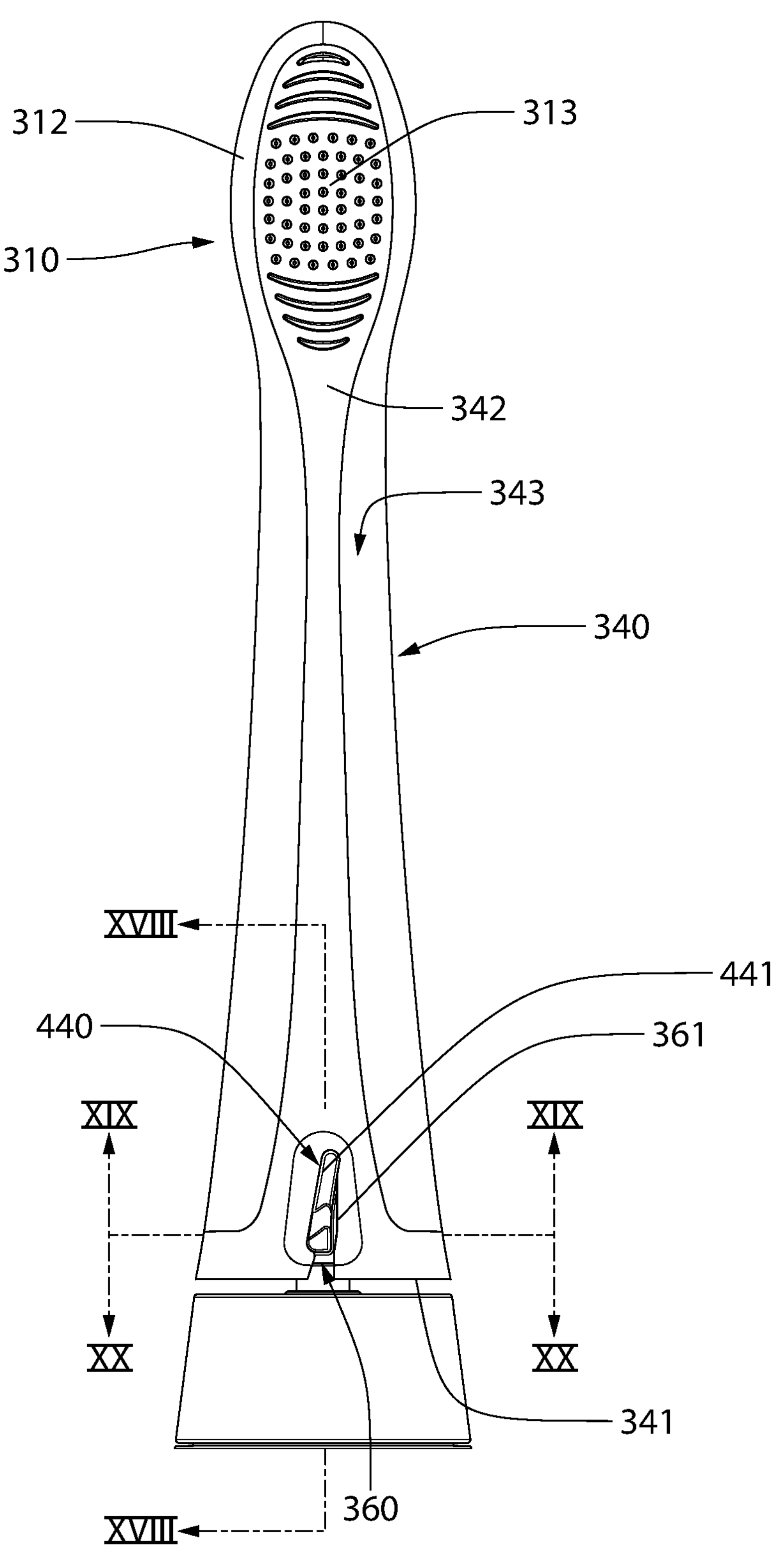
FIG. 17 is a rear view of a portion of the oral care implement of FIG. 1 which includes the oral care refill head and illustrates its connection to the handle.
Figure 18:
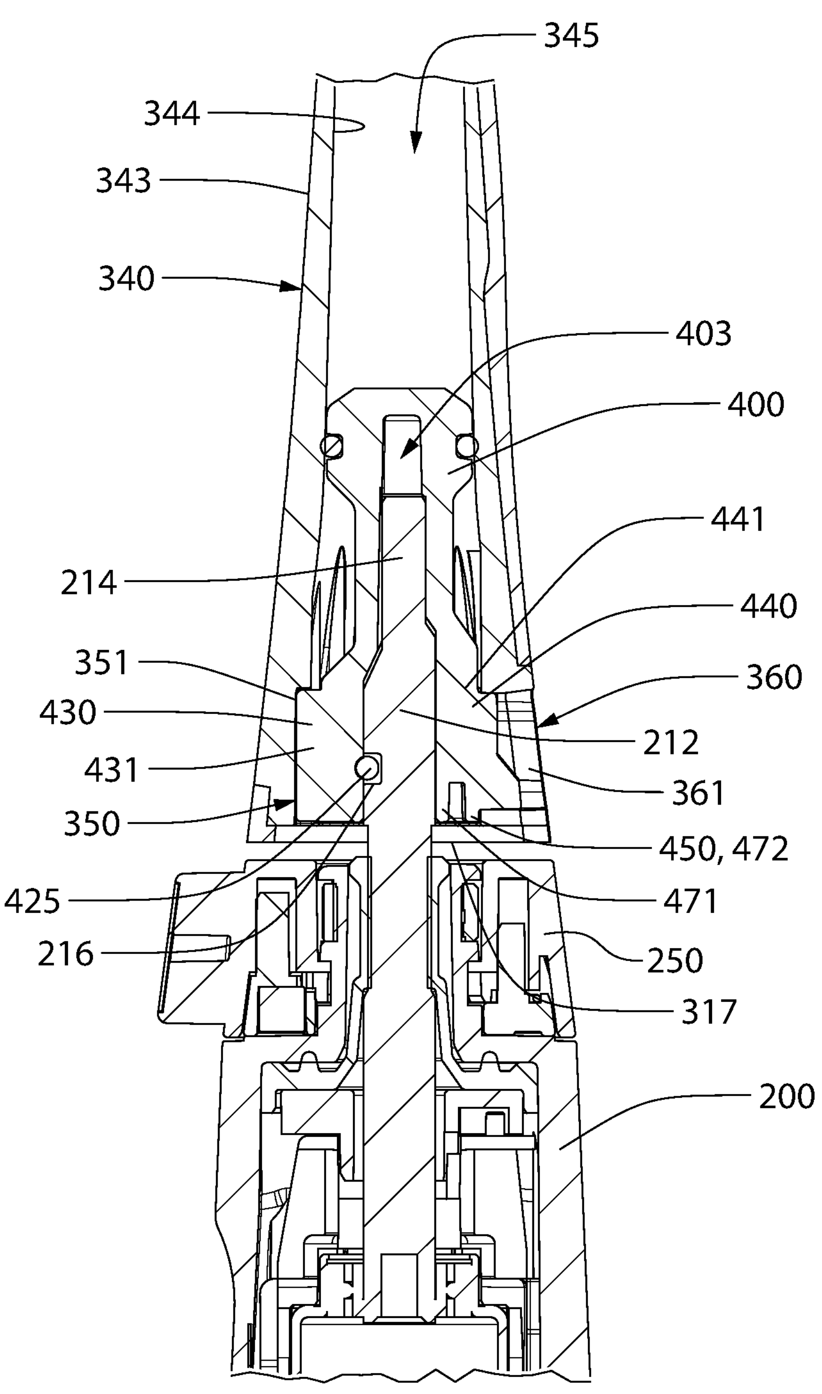
FIG. 18 is a cross-sectional view taken along line XVIII-XVIII of FIG. 17.

Referring to FIGS. 14-16, the adaptor 400 will be further described. As noted above, the adaptor 400 may be configured to be coupled to the distal portion 214 of the drive shaft 212, and the oral care refill head 300 may then be coupled directly to the adaptor 400. The coupling of the adaptor 400 to the drive shaft 212 and the oral care refill head 300 to the adaptor 400 may be sufficient to ensure that the oral care refill head 300 rotates or oscillates along with the drive shaft 212 when the motor is activated.

The adaptor 400 comprises a bottom end 401, a top end 402, and a longitudinal axis B-B extending from the bottom end 401 to the top end 402. The adaptor 400 may further comprise a blind hole 403 that extends from an opening 404 in the bottom end 401 in a direction towards the top end 402. The blind hole 403 may terminate in an end wall 405. Alternatively, instead of the blind hole 403 there may be a through-hole that extends from the opening 404 in the bottom end 401 to an opening in the top end 402. The blind hole 403 may be defined by an inner surface 406 of the adaptor 400. The adaptor 400 may comprise an outer surface 407 that forms an exterior of the adaptor 400.

The adaptor 400 may comprise an O-ring or gasket 410 positioned within an annular groove 411 that is formed into the outer surface 407. The O-ring 410 may help to ensure that there is a close-fit connection between the adaptor 400 and the refill head 300 while allowing for slight variances in the internal dimensions of the refill head 300.

Figure 3:
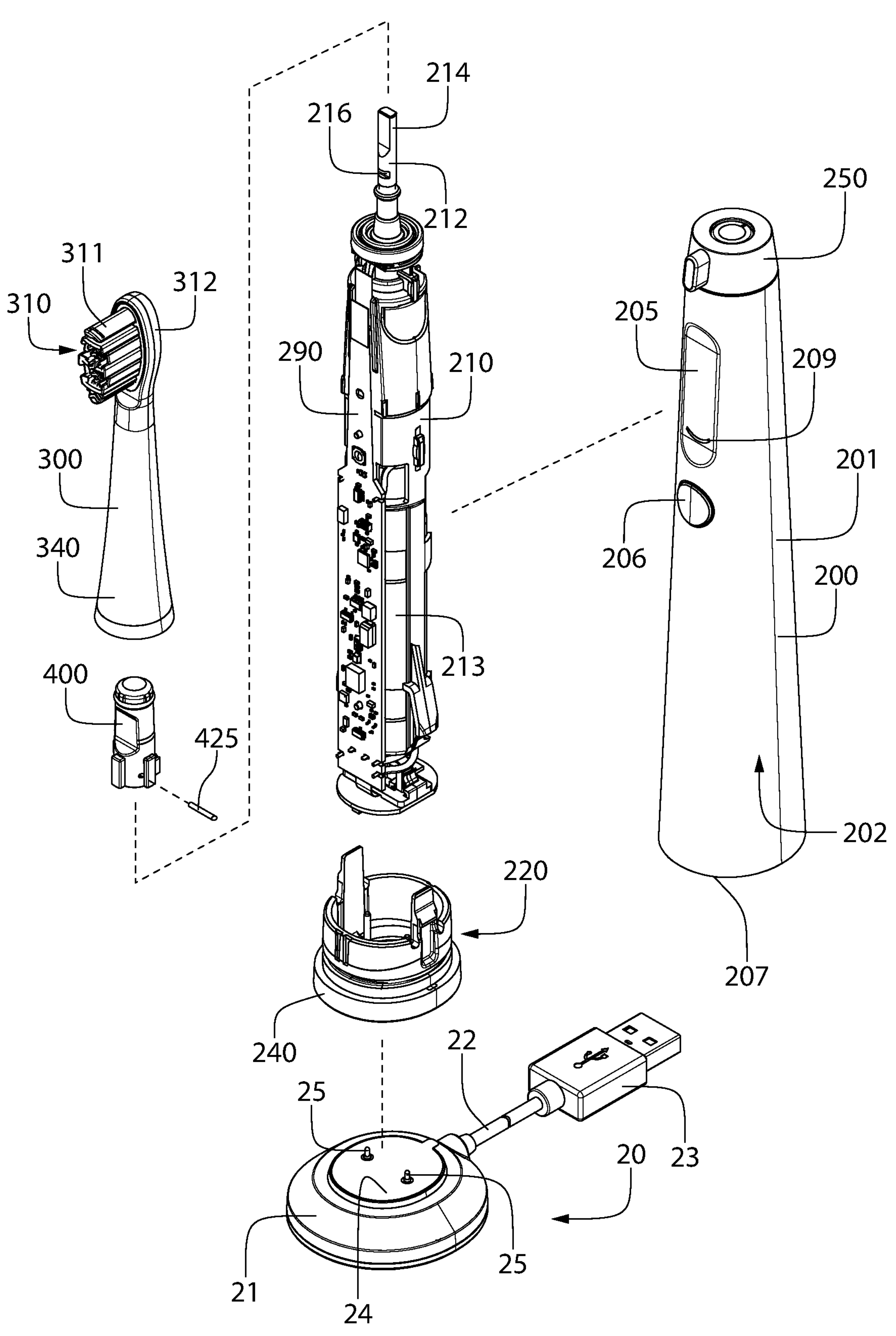
FIG. 3 is an exploded perspective view of the oral care implement and charger of FIG. 1.
Figure 4:
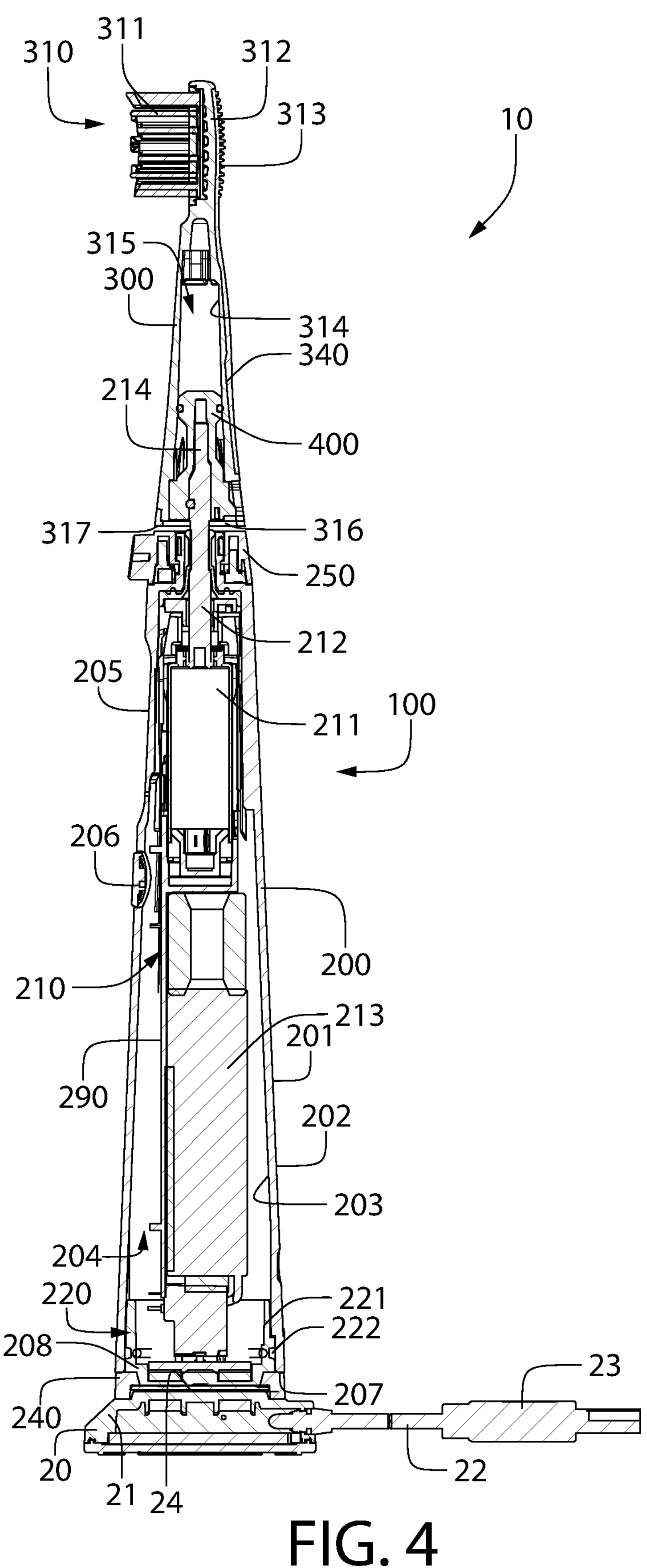
FIG. 4 is a cross-sectional view taken along line IV-IV of FIG. 1.

The adaptor 400 may comprise an aperture 420 extending in a direction that is transverse to the longitudinal axis B-B. A pin 425 may be configured to fit within the aperture 420 and extend across at least a portion of the blind hole 403. The pin 425 may nest within a channel or notch 216 that is formed into the distal portion 214 of the drive shaft 212 when the adaptor 400 is coupled thereto. The channel 216 is shown in FIG. 3 and also in FIG. 16. That is, the adaptor 400 may be press fit onto the distal portion 214 of the drive shaft 212 until the pin 425 enters into the channel 216 in the distal portion 214 of the drive shaft 212, which may achieve a locking engagement between the adaptor 400 and the drive shaft 212. Alternatively, the adaptor 400 may be fitted over the distal portion 214 of the drive shaft 212, and then the pin 425 may be inserted into the aperture 420 and through the channel 216 of the drive shaft 212 to lock the adaptor 400 to the drive shaft 212. The pin 425 may be detachable from the adaptor 400 if it is desired for the end user to be able to detach the adaptor 400 from the drive shaft 212. Alternatively, the pin 425 may be fixed to the adaptor 400 to fixedly couple the adaptor 400 to the drive shaft 212 and prevent its removal by a user under normal circumstances. When the adaptor 400 is coupled to the drive shaft 212, the distal end of the drive shaft 212 may be spaced apart from the end wall 405 of the blind hole 403 of the adaptor 400. In alternative embodiments, the distal end of the drive shaft 212 may abut against the end wall 405 of the blind hole 403 of the adaptor 400.

Moreover, the adaptor 400 may be attached to the drive shaft 212 in a fixed manner so that as the drive shaft 212 rotates or oscillates, so too does the adaptor 400. That is, there may be no relative rotation between the drive shaft 212 and the adaptor 400 and instead the adaptor 400 may rotate along with the drive shaft 212. In the exemplified embodiment, the bottom end 401 of the adaptor 400 is spaced apart from the top end of the handle 200. This ensures that the adaptor 400 does not rub against the handle 200 when it is being rotated by the drive shaft 212.

The adaptor 400 may comprise one or more alignment features 430 that may be required to be aligned with alignment features of the refill head 300 to allow for the refill head 300 to be coupled to the adaptor 400, as described below. The alignment features 430 may comprise protuberances 431 that extend from the outer surface 407 of the adaptor 400. The protuberances 431 may be spaced apart along the circumference of the adaptor 400.

The adaptor 400 may comprise a connection feature 440 configured to mate with a connection feature of the refill head 300 to facilitate the coupling of the refill head 300 to the adaptor 400. The connection feature 440 may comprise a connection protrusion 441. The adaptor 400 may comprise a circumferential portion 470 which comprises an inner wall 471 and an outer wall 472 that are spaced apart by a gap 473. A lower portion of the outer wall 472 may form a flexible tab portion 450 that is configured to flex radially inwardly and outwardly relative to the inner wall 471. The connection protrusion 441 may be located on the outer wall 471 (i.e., the flexible tab 450). The flexible tab portion 450 of the outer wall 472 may be defined between a first elongated slot 451 and a second elongated slot 452 which extend upwardly from the bottom end 401 of the adaptor 400 towards the top end 402 of the adaptor 400. The portion of the adaptor 400 located between the first and second slots 451, 452 may form the flexible tab portion 450 of the outer wall 472, which may be configured to flex inwardly/outwardly to facilitate the attachment/detachment of the refill head 300 to/from the adaptor 400. Because the flexible tab portion 450 has the slots 451, 452 on its opposing sides, this allows the flexible tab 450 to flex radially inwardly/outwardly relative to a remainder of the adaptor 400.

Figure 19:
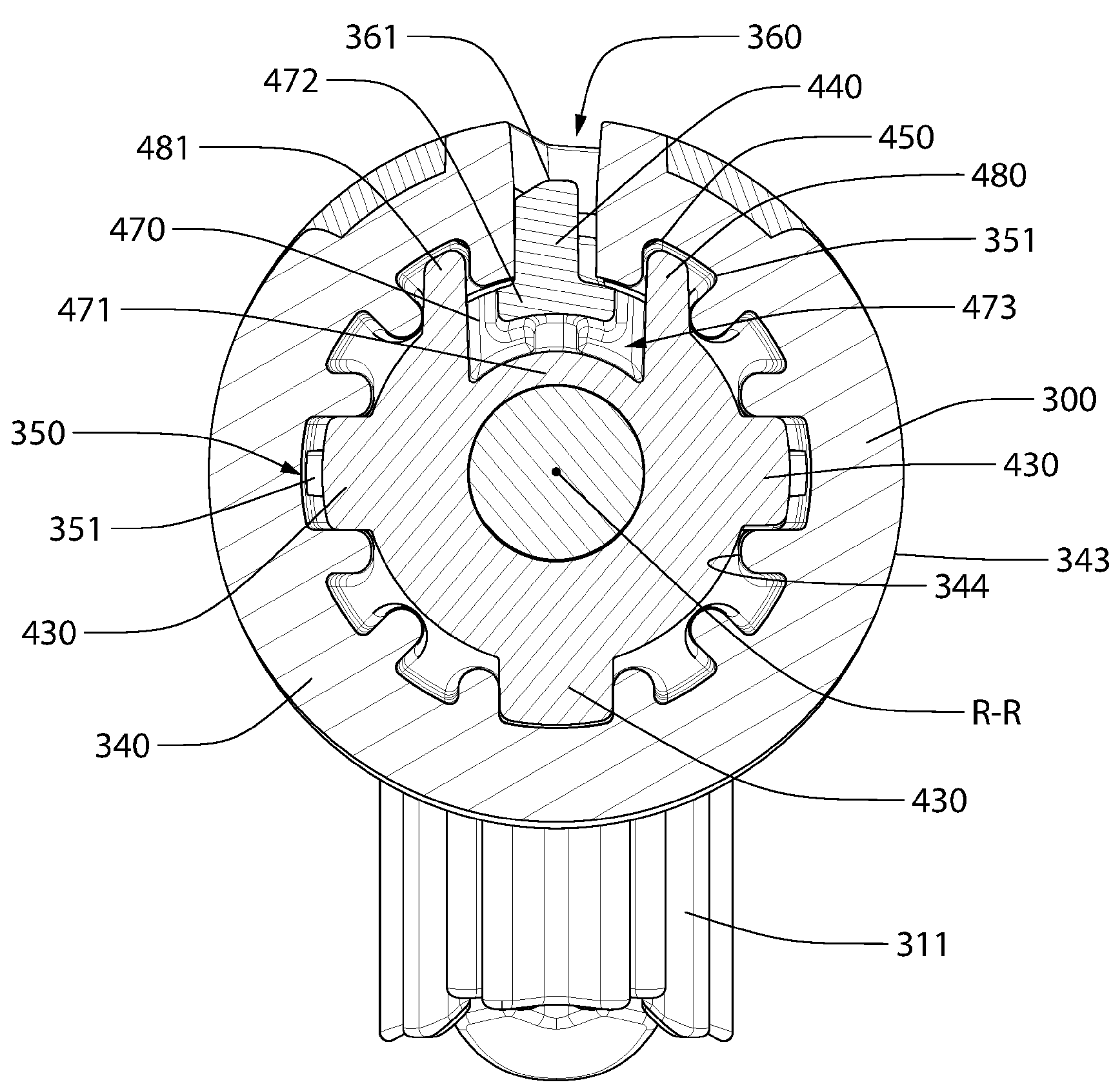
FIG. 19 is a cross-sectional view taken along line XIX-XIX of FIG. 17.
Figure 20:
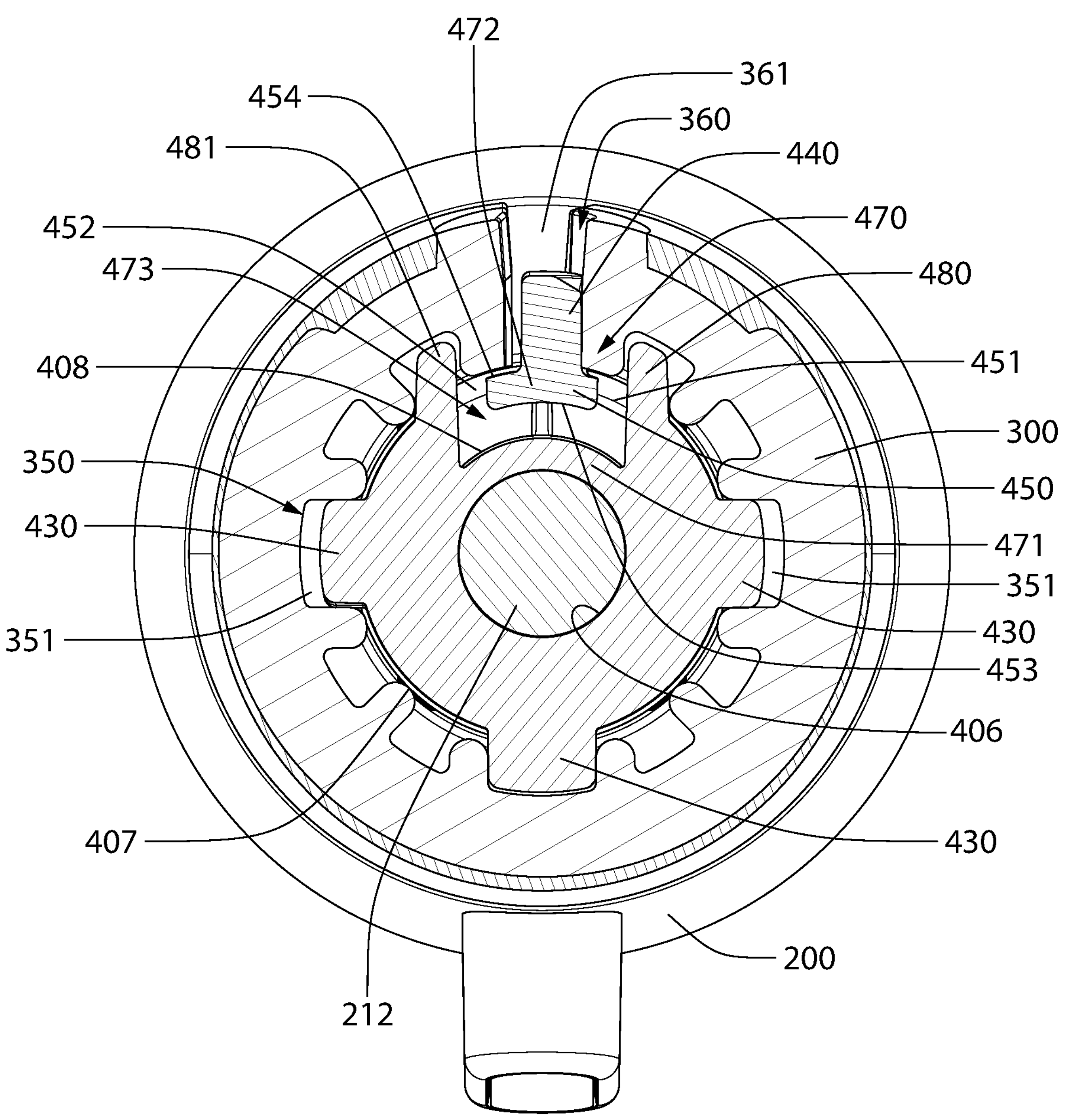
FIG. 20 is a cross-sectional view taken along line XX-XX of FIG. 17.

Referring to FIGS. 15, 19, and 20, the circumferential portion 470 of the adaptor 400 will be further described. As noted above, the flexible tab portion 450 may be defined between the first and second slots 451, 452. Furthermore, the flexible tab portion 450 may comprise an inner surface 453 and an outer surface 454, with the outer surface 454 forming a part of the outer/exterior surface 407 of the adaptor 400. The inner wall 471 of the circumferential portion 470 may comprise an inner surface portion which forms a portion of the inner surface 406 of the adaptor 400 and an intermediate outer surface 408 which is opposite the inner surface 406. The inner surface 453 of the flexible tab portion 450 may face, and be spaced apart from, the intermediate outer surface 408 of the inner wall 471 of the adaptor 400 by the gap 473. The first and second slots 451, 452 may have a thickness which extends from the outer surface 407 of the adaptor 400 to the intermediate outer surface 408 of the inner wall 471 of the circumferential portion 470. Thus, the flexible tab portion 450 may be able to flex inwardly until it contacts the intermediate outer surface 408. This may be important because if the first and second slots 451 extended the full thickness from the outer surface 407 to the inner surface 406, then the flexible tab portion 450 would potentially be incapable of flexing inwardly when the adaptor 400 is coupled to the drive shaft 212. This is because, as shown in FIG. 20, the drive shaft 212 may fill in the blind hole 403 and abut against the inner surface 406 of the adaptor 400.

The adaptor 400 may comprise a first boss 480 protruding from the outer surface 407 of the adaptor 400 adjacent to the first slot 451 and a second boss 481 protruding from the outer surface 407 of the adaptor 400 adjacent to the second slot 452. The circumferential portion 470 of the adaptor 400 may be the portion of the adaptor located between the first and second bosses 480, 481. Each of the first and second bosses 480, 481 may protrude from the outer surface 407 of the adaptor 400. The first and second slots 450, 451 may separate the flexible tab 450 from the first and second bosses 480, 481.

Referring to FIGS. 17-20, the refill head 300 and its engagement with the adaptor 400 will be described. The refill head 300 comprises the sleeve portion 340 and the oral care tool 310. The oral care tool 310 may comprise the head portion 312 and the plurality of tooth cleaning elements 311 and/or the soft tissue cleaner 313. The sleeve portion 340 may comprise a bottom end 341 and a top end 342, and the head portion 312 may be coupled or attached to the top end 342. The sleeve portion 340 may comprise an outer surface 343 and an inner surface 344. The inner surface 343 of the sleeve portion 340 may define a sleeve cavity 345.

The refill head 300 may comprise one or more alignment features 350 and one or more connection features 360. In the exemplified embodiment, the one or more alignment features 350 comprise channels 351 formed into the inner surface 344 of the sleeve portion 340 of the refill head 300. The channels 351 comprise channels having different widths to help to properly orient the refill head 300 relative to the adaptor 400 when coupling the two together. In particular, the channels 351 comprise larger width channels that are capable of receiving the protuberances 431 of the alignment features 430 of the adaptor 400 and smaller width channels that are too small to receive the protuberances 431. The smaller width channels may be sized and configured to receive the bosses 480, 481 of the adaptor 400 as shown in FIGS. 19 and 20. Thus, it may be required for the user to rotate the refill head 300 in a certain manner relative to the adaptor 400 to enable the alignment features 430 of the adaptor 400 to mate with the alignment features 350 of the refill head 300.

The connection feature 360 may comprise an opening or aperture 361 that extends from the bottom end 341 of the sleeve portion 340 upwardly towards the top end 342. The opening or aperture 361 may extend through the full thickness of the sleeve portion 340 of the refill head 300 from the outer surface 343 to the inner surface 344. The opening/aperture 361 may be configured to receive the connection protrusion 441 of the connection feature 440 of the adaptor 400 to facilitate the coupling of the refill head 300 to the adaptor 400.

Thus, to couple the refill head 300 to the adaptor 400, the refill head 300 may be aligned with the adaptor 400 and moved axially downwardly so that the adaptor 400 enters into the sleeve cavity 345 of the sleeve portion 340 of the refill head 300. If the refill head 300 bumps against the adaptor 400 before being properly secured thereon, this may indicate that the refill head 300 is not properly oriented relative to the adaptor 400 to permit the alignment features 430, 350 to properly mate with one another. The user may then rotate the refill head 300 relative to the adaptor 300 until the alignment features 430, 350 are circumferentially aligned. In the exemplified embodiment, this would then allow the protuberances 431 of the alignment features 430 of the adaptor 400 to enter into the channels 351 of the alignment features 350 of the oral care refill head 300. Of course, the refill head 300 could comprise the protuberances and the adaptor 400 could comprise the channels in other embodiments. Other mating features aside from protuberances/channels may also be used in other embodiments.

At the same time, once the refill head 300 is properly circumferentially oriented to facilitate attachment to the adaptor 400, the refill head 300 may be further translated onto the adaptor 400 until the connection feature 440 of the adaptor 400 engages/mates with the connection feature 360 of the refill head 300. This may comprise the connection protrusion 441 of the adaptor 400 nesting within the opening 361 of the refill head 300. The flexible tab portion 450 may flex inwardly and/or outwardly during the attachment of the refill head 300 to the adaptor 400, although this is not required in all embodiments. When the refill head 300 is coupled to the adaptor 400, which in turn is coupled to the drive shaft 212, the bottom end 317 of the refill head 300 may be spaced apart from the top end of the handle 200. This allows the refill head 300 to rotate without rubbing against the handle 200.

When the adaptor 400 is coupled to the drive shaft 212 and the refill head 300 is coupled to the adaptor 400, any rotation, oscillation, or the like of the drive shaft 212 will cause the adaptor 400 and the refill head 300 to also rotate, oscillate, or the like. That is, the drive shaft 212, adaptor 400, and refill head 300 are fixed to one another in a manner which prevents relative rotation of any one of the drive shaft 212, adaptor 400 and refill head 300 relative to any other of the drive shaft 212, adaptor 400 and refill head 300. In particular, the adaptor 400 is rotationally fixed relative to the drive shaft 212 due, at least in part, to the engagement of the pin 425 with the aperture 420 of the adaptor 400 and the channel/notch 216 of the drive shaft 212. Moreover, the distal portion 214 of the drive shaft 212 may have a square or rectangular cross-sectional shape, and the blind hole 403 of the adaptor 400 may also have a square or rectangular cross-sectional shape. As such, when the drive shaft 212 rotates/oscillates, it is unable to rotate/oscillate relative to the adaptor 400 but instead forces the adaptor 400 to rotate/oscillate along with it. Furthermore, the refill head 300 may be rotationally fixed relative to the adaptor 400 due, at least in part, to the engagement of the alignment features 430, 350 and the engagement of the connection features 440, 360 of the adaptor 400 and the refill head 300. Thus, if the motor rotates (or oscillates) the drive shaft 212 about a rotational axis R-R, the drive shaft 212, the adaptor 400, and the refill head 300 may all simultaneously rotate (or oscillate) about the same rotational axis R-R. The user may be able to readily detach the refill head 300 from the adaptor 400 for replacement when the tooth cleaning elements 311 become worn, and to then attach a new refill head to the adaptor 400.

The adaptor 400 may be coupled to the drive shaft 212 in a fixed manner by the manufacturer. The manufacturer may change the structure of the adaptor 400 depending on the structure of the refill head, and particularly the connection features thereof, that are intended to be coupled to the adaptor 400. This may allow for the manufacturer to maintain control over which refill heads may be used with the manufacturer's handle. Alternatively, the adaptor 400 may be detachable from the drive shaft 212 by the end user.

Figure 21:
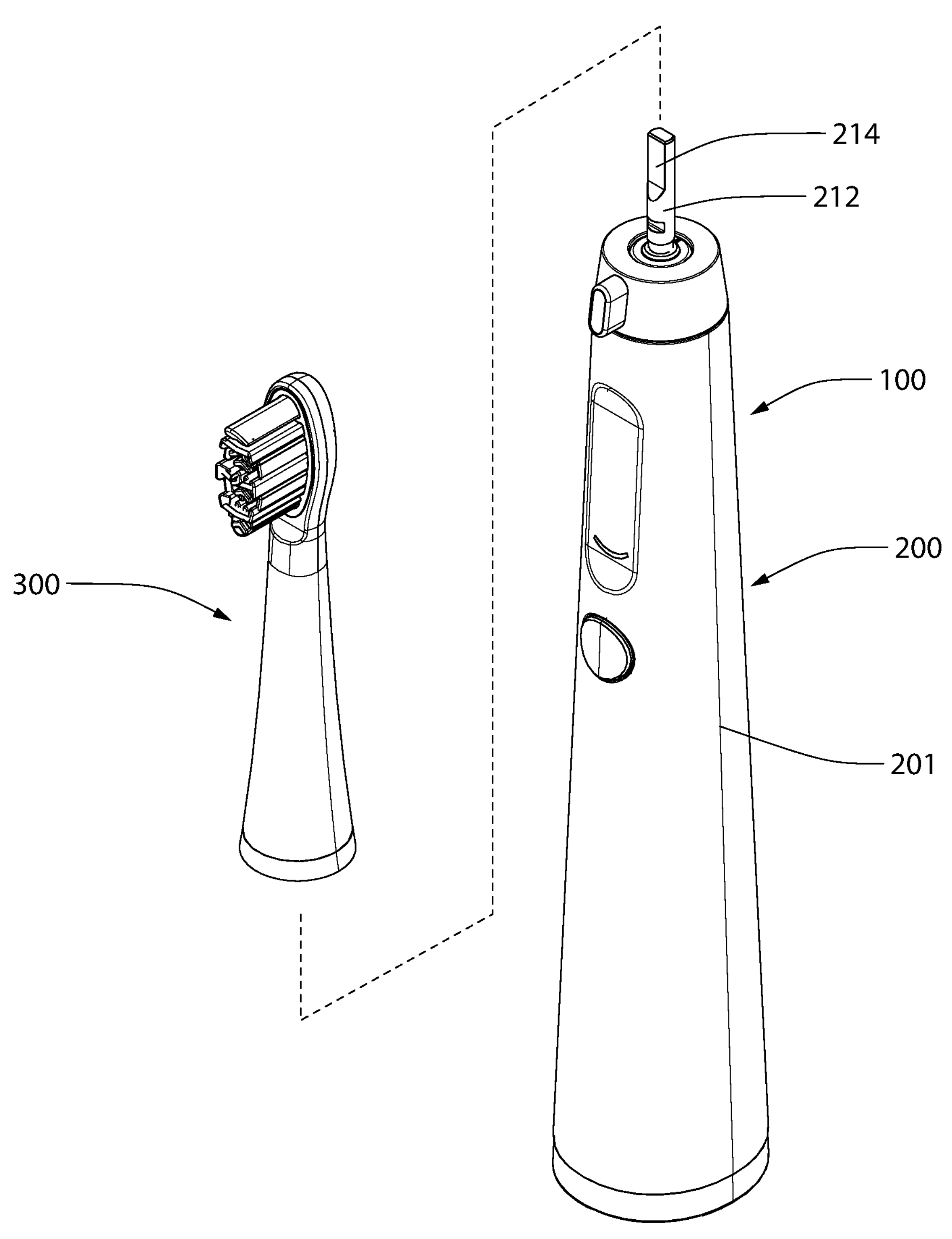
FIG. 21 is a perspective view of an oral care implement with a refill head detached from a handle in accordance with another embodiment whereby the adaptor is omitted.
Figure 22:
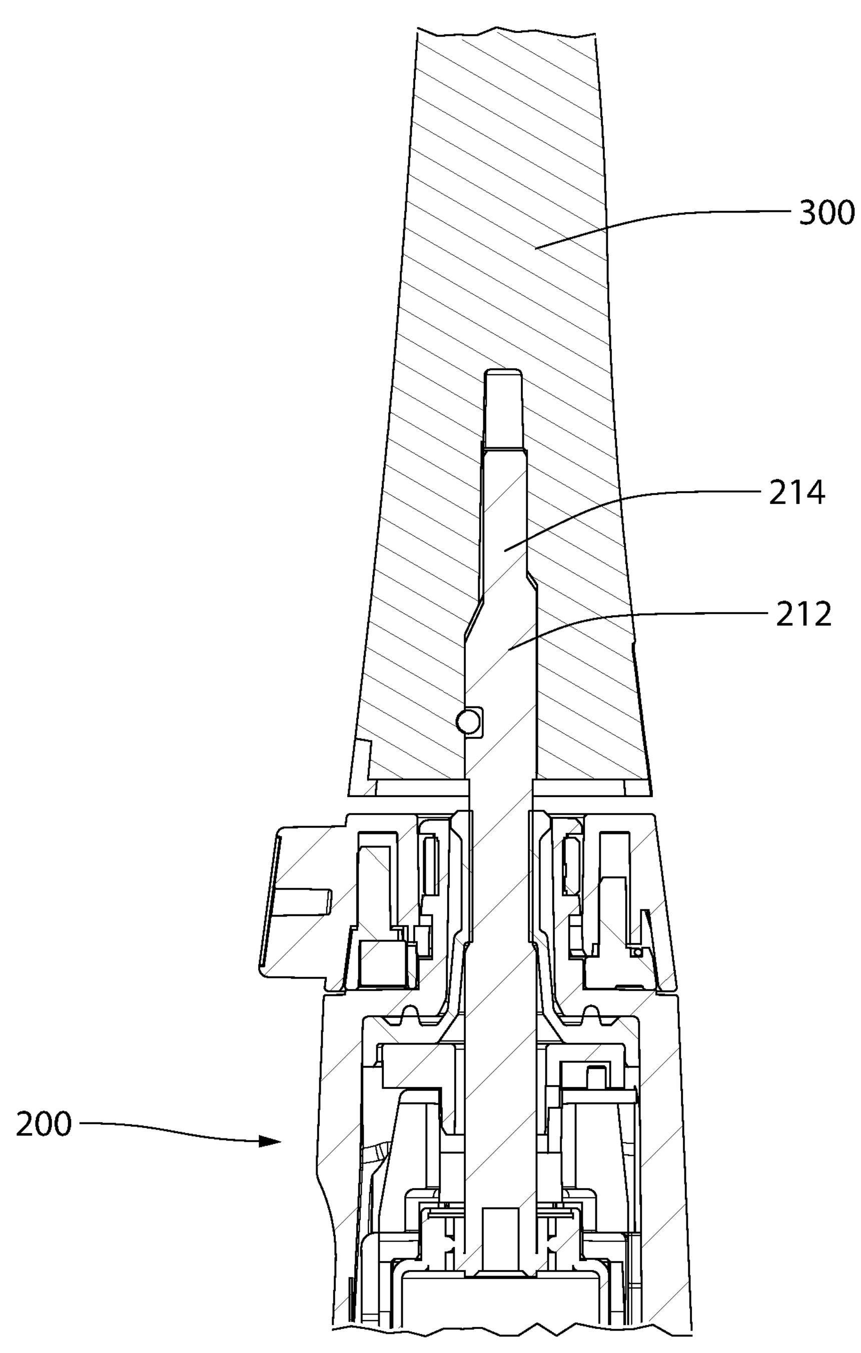
FIG. 22 is a cross-sectional view illustrating the refill head of FIG. 21 attached directly to a drive shaft of a motor of the handle of FIG. 21.

Referring to FIGS. 21 and 22, the oral care implement 100 may be sold without the adaptor 400 in circumstances where the refill head 300 is configured for direct attachment to the distal portion 214 of the drive shaft 212. In such embodiments, the refill head 300 may be required to have a different internal structure/dimensions to facilitate the attachment of the refill head 300 directly to the distal portion 214 of the drive shaft 212. It is known to create refill heads with different internal characteristics and structures for facilitating attachments to different styles of handles and the like. Thus, the refill head 300 may be manufactured with internal dimensions and structures that allow for adequate attachment of the refill head 300 directly to the drive shaft 212. In such an embodiment, rotation or oscillation of the drive shaft 212 will result in rotation/oscillation of the refill head 300. In some embodiments, different refill heads may be used depending on whether the adaptor 400 is included as part of the oral care implement.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care system comprising:

an oral care implement comprising an oral care tool for treating an oral cavity of a user during an oral care session;

a control circuit comprising, in operable cooperation:

a power source integrated into the oral care implement;

a trend tracking unit integrated into the oral care implement, wherein the trend tracking unit is configured to monitor:

a duration of each oral care session performed using the oral care implement; and a number of the oral care sessions performed using the oral care implement on a single day;

a trend indicator unit integrated into the oral care implement and configured to generate a user perceptible stimuli, wherein the user perceptible stimuli comprises a visible feedback element that is illuminated in different colors representative of the user's brushing trends;

wherein the trend indicator unit generates a first user perceptible stimuli when a first set of parameters is met, the first set of parameters comprising: (1) the duration of a current oral care session performed using the oral care implement exceeding a duration threshold; and (2) the number of the oral care sessions performed on the single day meeting or exceeding a frequency threshold, wherein the first user perceptible stimuli comprises illuminating the visible feedback element in a first solid color; and wherein the trend indicator unit generates a second user perceptible stimuli when the first set of parameters is met for at least a predetermined number of consecutive days, wherein the second user perceptible stimuli comprises illuminating the visible feedback element with a plurality of different colors to indicate achievement of a brushing streak, and wherein the predetermined number of consecutive days is adjustable based on user-specific brushing trends analyzed by the trend tracking unit;

wherein the trend indicator unit generates a third user perceptible stimuli when the duration of the current oral care session does not exceed the duration threshold, and wherein the third user perceptible stimulus comprises illuminating the visible feedback element in a second solid color;

wherein the trend indicator unit generates a fourth user perceptible stimuli when the duration of the current oral care session exceeds the duration threshold but the number of the oral care sessions performed on the single day does not meet the frequency threshold, wherein the fourth user perceptible stimuli comprises illuminating the visible feedback element in a third solid color, each of the first, second, and third solid colors being different.

2. The oral care system according to claim 1 wherein the first and second user perceptible stimuli are generated by the trend indicator unit upon completion of the current oral care session being performed using the oral care implement.

3. The oral care system according to claim 1 wherein the second user perceptible stimuli is generated by the trend indicator unit upon powering on the oral care implement.

4. The oral care system according to claim 1 wherein the oral care implement comprises a handle and a head having tooth cleaning elements located thereon, the handle comprising a display portion on which the user perceptible stimuli is displayed, wherein the handle comprises a front surface, wherein a power button configured to power the oral care implement on and off and the display portion are located on the front surface of the handle, wherein the oral care implement comprises a longitudinal axis, and wherein the display portion is located axially between the power button and the head.

5. The oral care system according to claim 1 wherein the second user perceptible stimuli comprises illumination of the visible feedback element with a plurality of different colors either simultaneously or sequentially.

6. The oral care system according to claim 1 wherein the visible feedback element is illuminated in a fourth color when a charge of the power source is below a power threshold, a fifth color when the power source is being charged and the first set of parameters has not been met for the predetermined number of consecutive days, and a sixth color when the power source is being charged and the first set of parameters has been met for the predetermined number of consecutive days.

7. The oral care system according to claim 1 wherein the duration threshold is in a range of two to three minutes, the single day comprises an 18 to 24 hour time period on one calendar day, and the frequency threshold is two.

8. The oral care system according to claim 1 wherein the predetermined number of consecutive days is three days.

9. The oral care system according to claim 1 wherein the predetermined number of consecutive days is adjustable based on personal brushing trends for a particular user.

10. The oral care system according to claim 1 wherein the visible feedback element has a fixed arcuate shape representative of a smile displayed on a display portion of a handle of the oral care implement, and wherein the visible feedback element lights up in the arcuate shape when the oral care implement is powered on.

11. The oral care system according to claim 1 wherein the brushing streak comprises at least seven consecutive days of meeting the first set of parameters.

12. The oral care system according to claim 1 wherein the predetermined number of consecutive days is automatically adjustable by an artificial intelligence algorithm that is tailored to the particular user's brushing habits and trends over time.

13. The oral care system according to claim 1, wherein the second user perceptible stimuli comprises illuminating the visible feedback element in a rainbow color such that portions of the visible feedback element illuminate in a plurality of different colors simultaneously to indicate achievement of the brushing streak.

14. The oral care system according to claim 1, wherein the visible feedback element is illuminated in a distinct color when the oral care implement is wirelessly connected to an external electronic device.

15. An oral care system comprising:

an oral care implement comprising an oral care tool for treating an oral cavity of a user;

a control circuit comprising, in operable cooperation:

a power source integrated into the oral care implement;

a trend tracking unit integrated into the oral care implement, wherein for each oral care session performed using the oral care implement the trend tracking unit is configured to monitor:

a duration of the oral care session; and a number of the oral care sessions performed in a single day;

a trend indicator unit integrated into the oral care implement and configured to generate a user perceptible stimuli, wherein the user perceptible stimuli comprises a visible feedback element that is illuminated in different colors representative of the user's brushing trends;

wherein the trend indicator unit generates a first user perceptible stimuli when a first set of parameters is met for at least a predetermined number of consecutive days, the first set of parameters comprising: (1) the duration of a current oral care session performed using the oral care implement exceeding a duration threshold; and (2) the number of the oral care sessions performed in the single day meeting or exceeding a frequency threshold, wherein the first user perceptible stimuli comprises illuminating the visible feedback element with a plurality of different colors to indicate achievement of a brushing streak;

wherein the trend indicator unit generates a second user perceptible stimuli when the first set of parameters is met for a number of days that is fewer than the predetermined number of consecutive days;

wherein the trend indicator unit generates a third user perceptible stimuli when the duration of the current oral care session does not exceed the duration threshold;

wherein the trend indicator unit generates a fourth user perceptible stimuli when the duration of the current oral care session exceeds the duration threshold but the number of the oral care sessions performed on the single day does not meet the frequency threshold;

each of the first, second, third, and fourth user perceptible stimuli being different; and wherein the trend tracking unit is further configured to determine, for each day, whether a brushing compliance condition is met based on both the duration threshold and the frequency threshold, and wherein the predetermined number of consecutive days is dynamically adjustable based on the user's brushing trends.

16. The oral care system according to claim 15 wherein the duration threshold is two minutes, the single day comprises an 18 to 24 hour time period on one calendar day, the frequency threshold is two, and the predetermined number of consecutive days is at least three days.

17. The oral care system according to claim 15 wherein the second user perceptible stimuli comprises illuminating the visible feedback element with a first solid color, wherein the third user perceptible stimuli comprises illuminating the visible feedback element with a second solid color different from the first solid color, and wherein the fourth user perceptible stimuli comprises illuminating the visible feedback element with a third solid color different from the first and second solid colors.

18. The oral care system according to claim 15, wherein the visible feedback element has a fixed arcuate shape representative of a smile.

19. The oral care system according to claim 15, wherein the predetermined number of consecutive days is automatically adjustable by an artificial intelligence algorithm that is tailored to the particular user's brushing habits and trends over time.

20. The oral care system according to claim 15, wherein the second user perceptible stimuli comprises illuminating the visible feedback element in a rainbow color such that portions of the visible feedback element illuminate in a plurality of colors simultaneously to indicate achievement of the brushing streak.

* * * * *